United States Patent
Yamamoto et al.

(10) Patent No.: US 12,200,737 B2
(45) Date of Patent: **\*Jan. 14, 2025**

(54) BASE STATION, TERMINAL, AND COMMUNICATION METHOD

(71) Applicant: Panasonic Intellectual Property Corporation of America, Torrance, CA (US)

(72) Inventors: Tetsuya Yamamoto, Kanagawa (JP); Ayako Horiuchi, Kanagawa (JP); Takashi Iwai, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,800

(22) Filed: Feb. 20, 2024

(65) Prior Publication Data

US 2024/0196410 A1 Jun. 13, 2024

Related U.S. Application Data

(63) Continuation of application No. 18/298,804, filed on Apr. 11, 2023, now Pat. No. 11,943,788, which is a (Continued)

(30) Foreign Application Priority Data

May 20, 2016 (JP) .................................. 2016-101453

(51) Int. Cl.
*H04L 5/00* (2006.01)
*H04L 1/18* (2023.01)
(Continued)

(52) U.S. Cl.
CPC ............... *H04W 72/23* (2023.01); *H04L 1/18* (2013.01); *H04L 1/1854* (2013.01);
(Continued)

(58) Field of Classification Search
None
See application file for complete search history.

(56) References Cited

U.S. PATENT DOCUMENTS 11,419,099 B2    8/2022   Jiang et al.
2008/0095109 A1   4/2008   Malladi et al.
(Continued)

FOREIGN PATENT DOCUMENTS

CN     103688584 A    3/2014
JP      2013106144 A   5/2013
(Continued)

OTHER PUBLICATIONS

3GPP TSG RAN WG1 84b, R1-163112, NTT DOCOMO, "Initial views on frame structure for NR access technology," Apr. 2016. (7 pages).
(Continued)

*Primary Examiner* — Kodzovi Acolatse
(74) *Attorney, Agent, or Firm* — Seed IP Law Group LLP

(57) ABSTRACT

A terminal includes a receiver, which, in operation, receives time unit information related to an amount of an uplink time resource per a time unit, and receives a number of repetitions over a plurality of the time units, wherein the time unit includes a downlink time resource for a downlink signal and the uplink time resource for a response signal. The amount of the uplink time resource is expressed as a fixed number of consecutive symbols that remains the same number over the plurality of the time units over which the response signal is repeatedly transmitted. The terminal includes a transmit-
(Continued)

ter, which, in operation, repeatedly transmits the response signal over the plurality of the time units.

12 Claims, 19 Drawing Sheets

Related U.S. Application Data continuation of application No. 17/200,335, filed on Mar. 12, 2021, now Pat. No. 11,659,567, which is a continuation of application No. 16/097,794, filed as application No. PCT/JP2017/015813 on Apr. 20, 2017, now Pat. No. 10,999,830.

(51) Int. Cl.
| | | |
|---|---|---|
| *H04L 1/1829* | (2023.01) | |
| *H04L 5/14* | (2006.01) | |
| *H04L 69/324* | (2022.01) | |
| *H04W 28/04* | (2009.01) | |
| *H04W 72/23* | (2023.01) | |
| *H04W 88/02* | (2009.01) | |
| *H04W 88/08* | (2009.01) | |

(52) U.S. Cl.
CPC .......... *H04L 1/1858* (2013.01); *H04L 1/1861* (2013.01); *H04L 5/0044* (2013.01); *H04L 5/0053* (2013.01); *H04L 5/0055* (2013.01); *H04L 5/1469* (2013.01); *H04L 69/324* (2013.01); *H04W 28/04* (2013.01); *H04L 5/0094* (2013.01); *H04W 88/02* (2013.01); *H04W 88/08* (2013.01)

(56) References Cited

U.S. PATENT DOCUMENTS

| | | | |
|---|---|---|---|
| 2009/0110038 | A1 | 4/2009 | Montojo et al. |
| 2013/0028069 | A1 | 1/2013 | Pelletier et al. |
| 2013/0250886 | A1 | 9/2013 | Zhou et al. |
| 2014/0079022 | A1 | 3/2014 | Wang et al. |
| 2014/0119335 | A1 | 5/2014 | Wang et al. |
| 2014/0133452 | A1 | 5/2014 | Nogami et al. |
| 2014/0307689 | A1 | 10/2014 | Kishiyama |
| 2015/0208391 | A1 | 7/2015 | Park |
| 2016/0262182 | A1 | 9/2016 | Yang et al. |
| 2016/0337089 | A1 | 11/2016 | Chen et al. |
| 2017/0026992 | A1 | 1/2017 | Jiang et al. |
| 2017/0041911 | A1 | 2/2017 | Yamamoto et al. |
| 2017/0041921 | A1 | 2/2017 | Oketani |
| 2017/0156138 | A1 | 6/2017 | Yamamoto et al. |
| 2017/0164397 | A1* | 6/2017 | Zeng ................... H04L 1/1854 |
| 2017/0180098 | A1 | 6/2017 | You et al. |
| 2017/0208583 | A1 | 7/2017 | Jiang et al. |
| 2017/0332359 | A1 | 11/2017 | Tsai et al. |
| 2018/0234880 | A1* | 8/2018 | Jiang ..................... H04W 28/04 |
| 2018/0242315 | A1* | 8/2018 | Sun ....................... H04W 72/23 |
| 2018/0359762 | A1 | 12/2018 | Xiong et al. |
| 2019/0013908 | A1 | 1/2019 | Xiong et al. |
| 2019/0014560 | A1 | 1/2019 | Takeda et al. |
| 2019/0200384 | A1* | 6/2019 | Hao ..................... H04W 74/006 |

FOREIGN PATENT DOCUMENTS

| | | |
|---|---|---|
| JP | 2015149787 A | 8/2015 |
| JP | 2015534355 A | 11/2015 |
| WO | 2011054176 A1 | 5/2011 |
| WO | 2015056946 A1 | 4/2015 |
| WO | 2015103722 A1 | 7/2015 |
| WO | 2015107600 A1 | 7/2015 |
| WO | 2015170435 A1 | 11/2015 |
| WO | 2016031115 A1 | 3/2016 |
| WO | 2016040290 A1 | 3/2016 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 13)," 3GPP TS 36.212 V13.1.0, Mar. 2016. (129 pages).

3GPP, "3rd Generation Partnership Project; Technical Specification Group Radio Access Network; Evolved Universal Terrestrial Radio Access (E-UTRA); Physical channels and modulation (Release 13)," 3GPP TS 36.211 V13.0.0, Dec. 2015. (141 pages).

3GPP, "3rd Generation Partnership Project; Technical Specification Group Radio Access Network; Evolved Universal Terrestrial Radio Access (E-UTRA); Physical channels and modulation (Release 13)," 3GPP TS 36.211 V13.1.0, Mar. 2016. (155 pages).

3GPP, "3rd Generation Partnership Project; Technical Specification Group Radio Access Network; Evolved Universal Terrestrial Radio Access (E-UTRA); Physical layer procedures (Release 12)," 3GPP TS 36.213 V12.9.1, Mar. 2016. (241 pages).

3GPP, 3rd Generation Partnership Project; Technical Specification Group Radio Access Network; Evolved Universal Terrestrial Radio Access (E-UTRA); Physical layer procedures (Release 13), 3GPP TS 36.213 V13.1.0, Mar. 2016. (361 pages).

Communication pursuant to Article 94(3) EPC dated Aug. 24, 2020 for the related European Patent Application No. 17799104.9, 8 pages.

Ericsson, "WF on AI 7.2.1.5 PUCCH and UCI," R1-156325, Agenda item 7.2.1.5, 3GPP TSG RAN WG1 Meeting #82bis, Malmö, Sweden, Oct. 5-9, 2015. (7 pages).

Huawei et al., "Discussion on frame structure for NR", 3GPP TSG RAN WG1 Meeting #85, Nanjing, China, May 23-27, 2016, Agenda Item 7.1.4, Document No. R1-164032, 8 pages.

Huawei, HiSilicon, "Remaining details of PUCCH resource determination for MTC UEs," R1-156445, Agenda Item: 6.2.1.6, 3GPP TSG RAN WG1 Meeting #83, Anaheim, USA, Nov. 15-22, 2015. (8 pages).

Indian Examination Report dated May 10, 2021 for the related Indian Patent Application No. 201847040918.

Indian Office Action dated Sep. 15, 2023 for the related Indian Patent Application No. 201847040918, 2 pages.

International Search Report of PCT application No. PCT/JP2017/015813 dated Jun. 27, 2017.

KT Corp., "Considerations on frame structure for NR," R1-165311, Agenda Item: 7.1.4, 3GPP TSG RAN WG1 Meeting #85, Nanjing, China, May 23-27, 2016, 3 pages.

LG Electronics, "Detailed design of PUCCH and UCI for MTC UE," R1-155370, Agenda Item: 7.2.1.5, 3GPP TSG RAN WG1 Meeting #82bis, Malmö, Sweden, Oct. 5-9, 2015. (5 pages).

NTT DOCOMO et al: "Discussion on frame structure for NR", 3GPP Draft; R1-165176, 3rd Generation Partnership Project (3GPP), Mobile Competence Centre ; 650, Route Des Lucioles ; F-06921 Sophia-Antipolis Cedex ; France, vol. RAN WG1, No. Nanjing; May 23-May 27, 2016 May 14, 2016 (May 14, 2016), XP051096227, Retrieved from the Internet: URL:http://www.3gpp.org/ftp/tsg_ran/WG1_RL1/TSGR1_85/Docs/ [retrieved on May 14, 2016].

Qualcomm Incorporated, "Physical Uplink Control Channels," R1-152766, Agenda item: 6.2.1.5, 3GPP TSG RAN WG1 #81, Fukuoka, Japan, May 25-29, 2015. (4 pages).

Samsung, "Discussion on TTI, subframe and signalling timing for NR," R1-164004, Agenda Item: 7.1.4, 3GPP TSG RAN WG1 Meeting #85, Nanjing, China, May 23-27, 2016, 5 pages.

The Extended European Search Report dated Apr. 10, 2019 for the related European Patent Application No. 17799104.9.

Wang et al., "Cellular Machine-Type Communications: Physical Challenges and Solutions," IEEE Wireless Communications 23(2):126-135, Apr. 2016.

Zte et al., "Discussions on HARQ operation for NR", 3GPP TSG-RAN WG1 Meeting #85, Nanjing, China, May 23-27, 2016, Agenda Item 7.1.4, Document No. R1-164276, 6 pages.

* cited by examiner

100

200

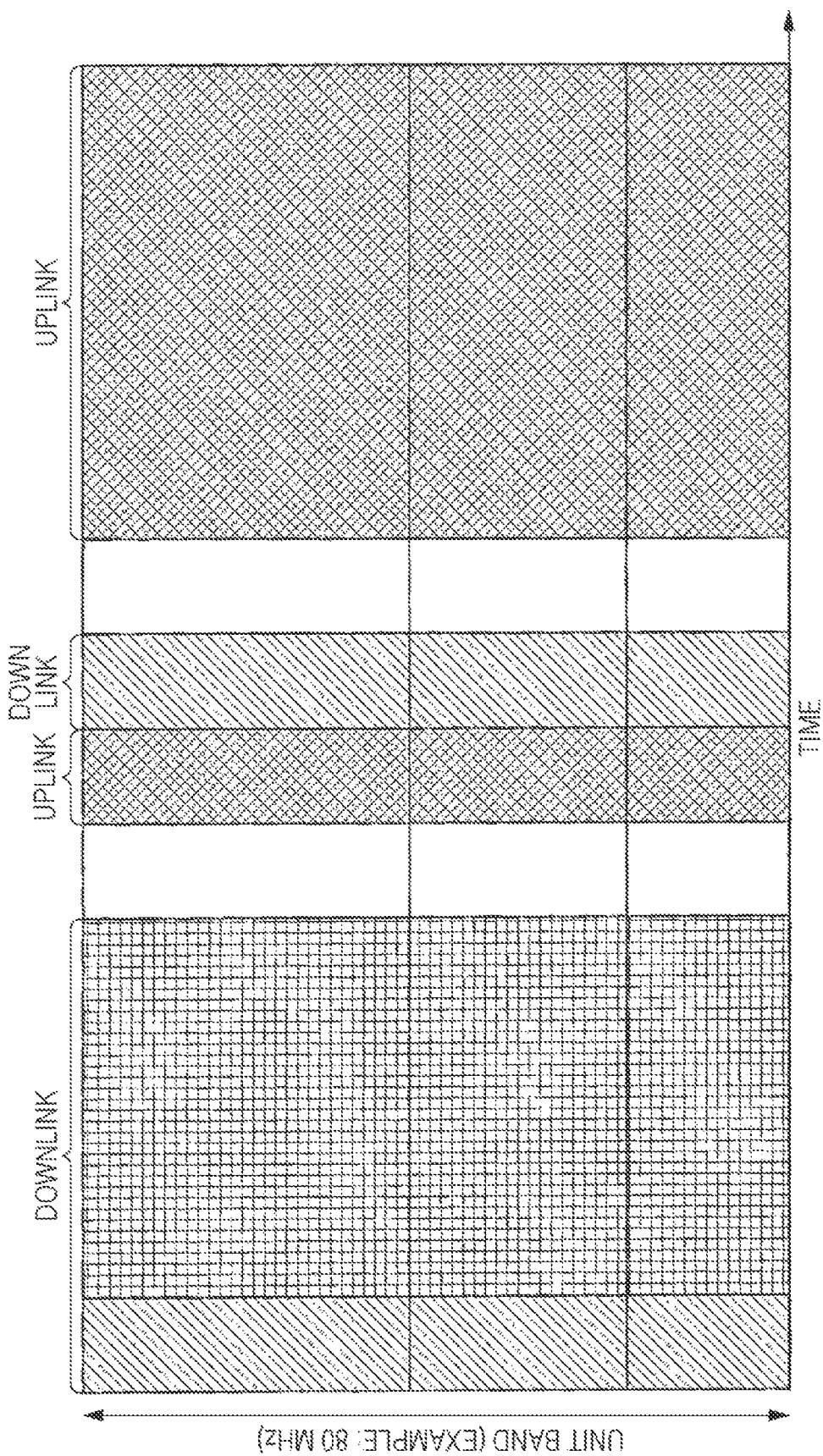

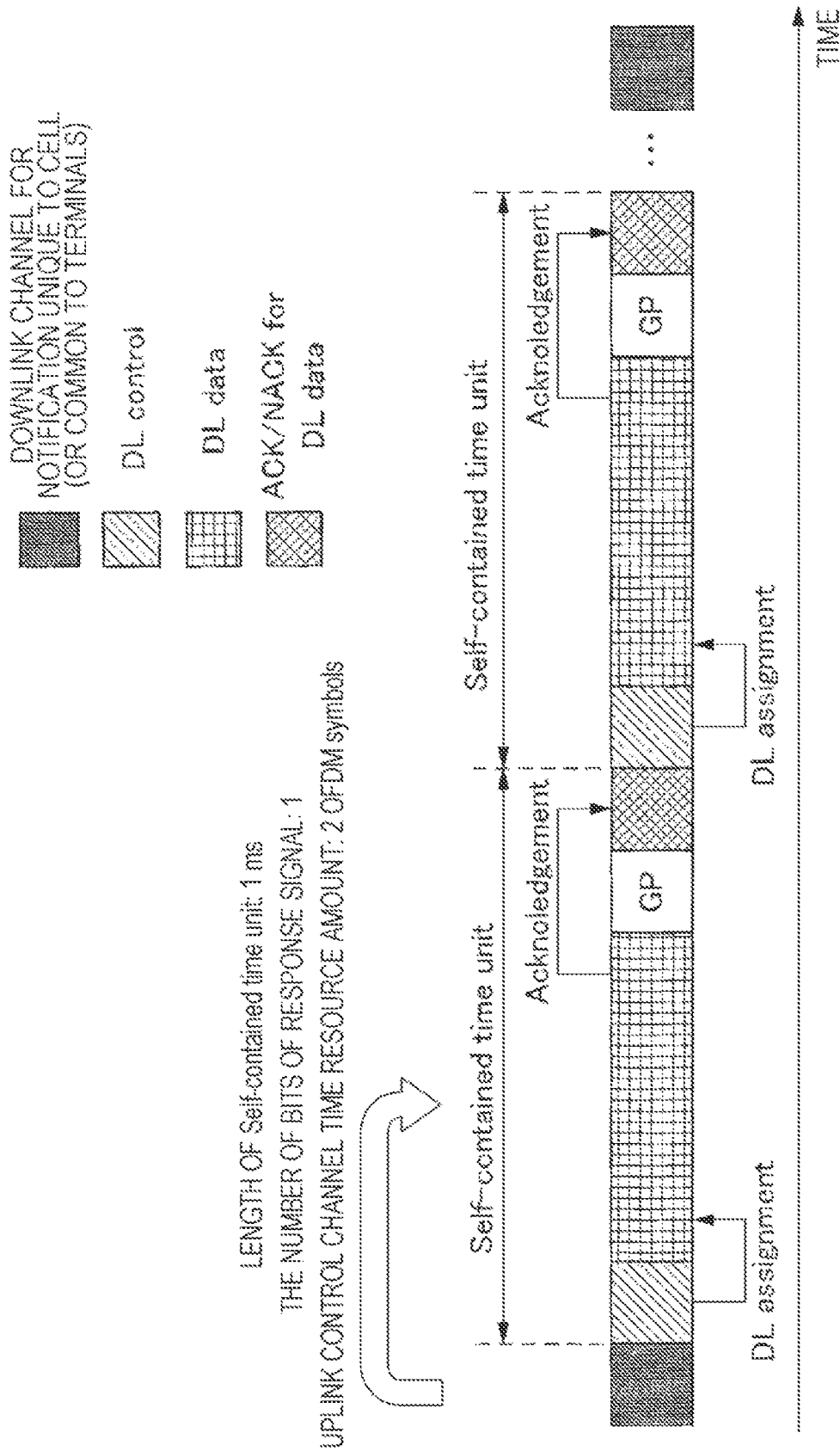

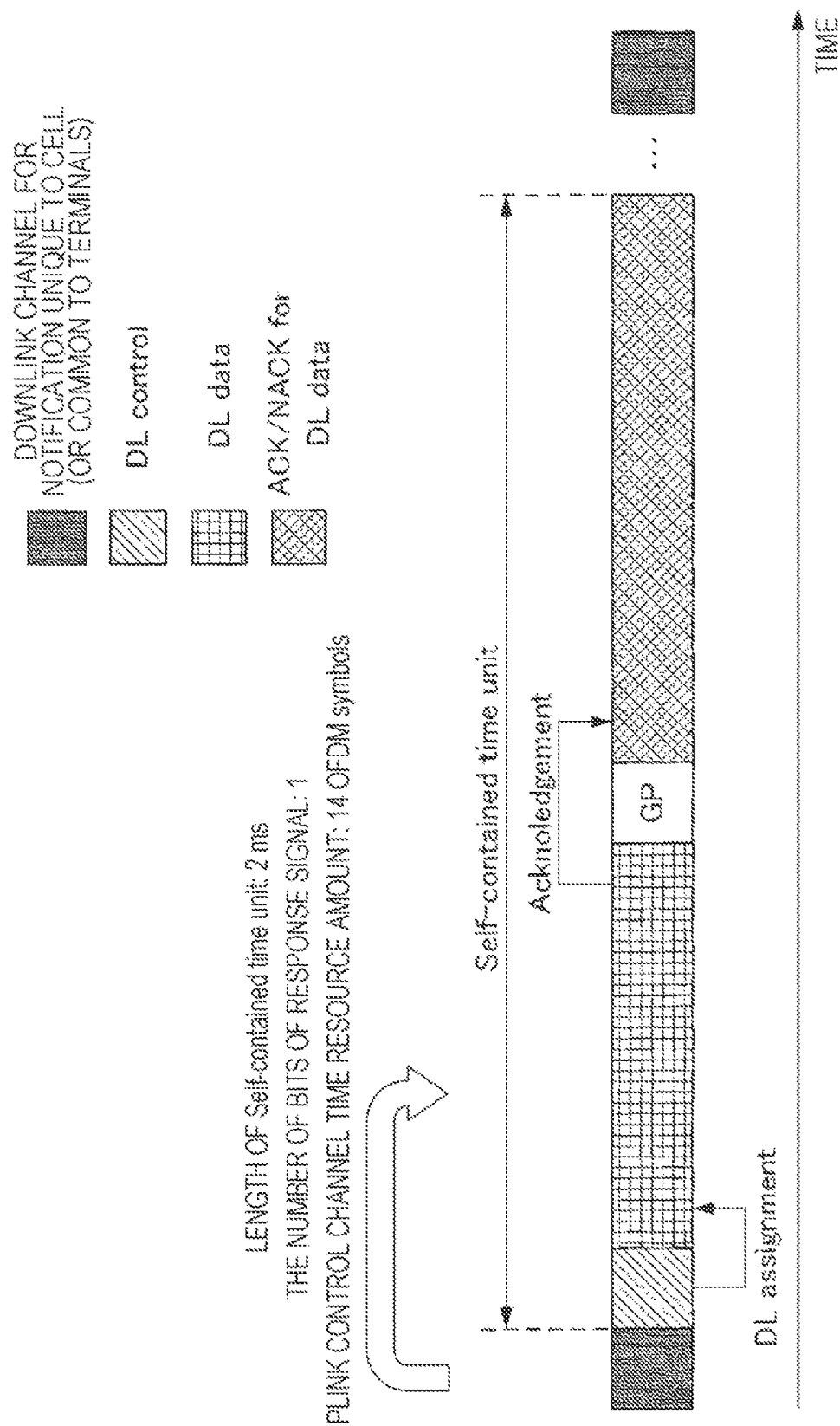

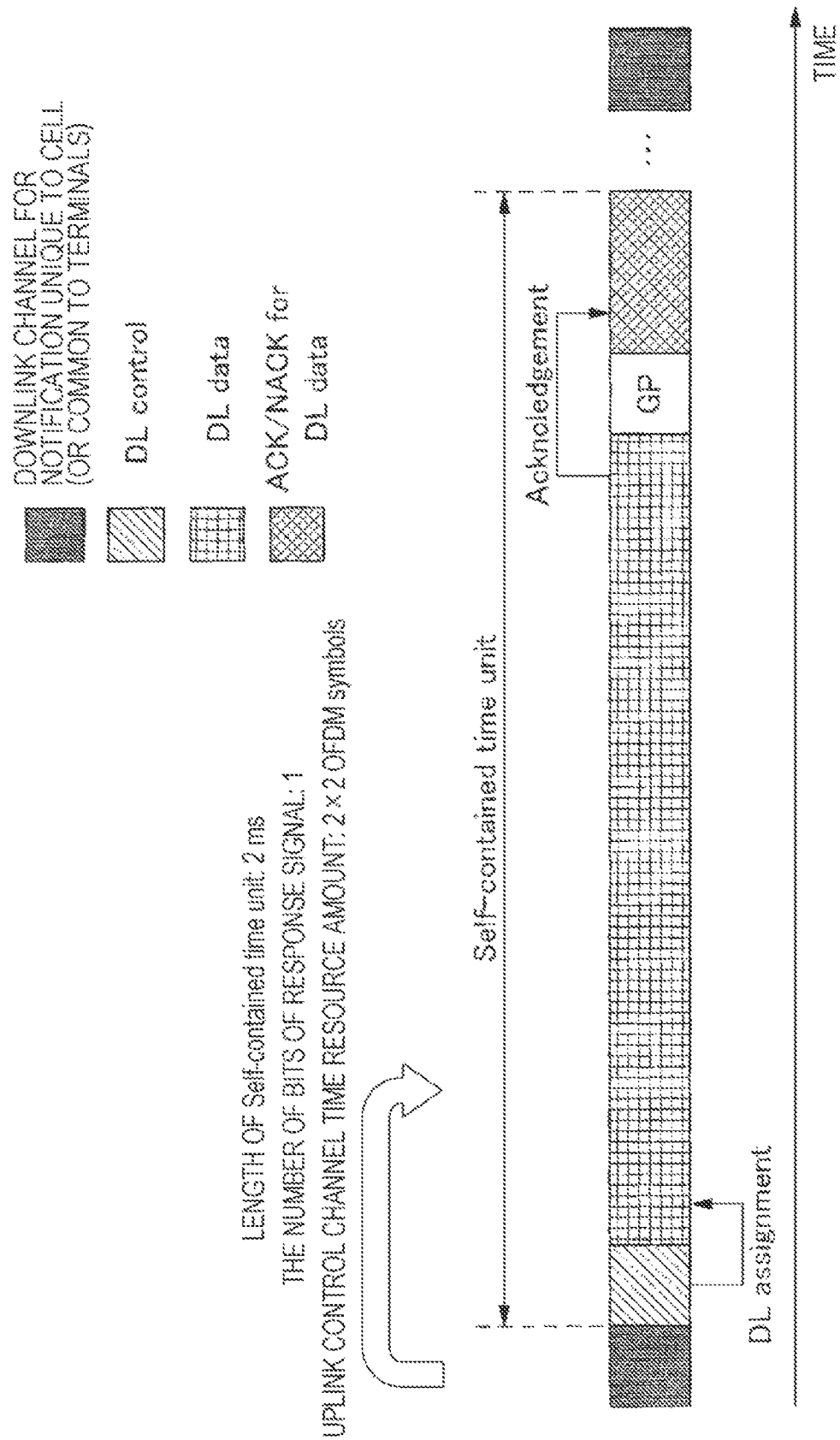

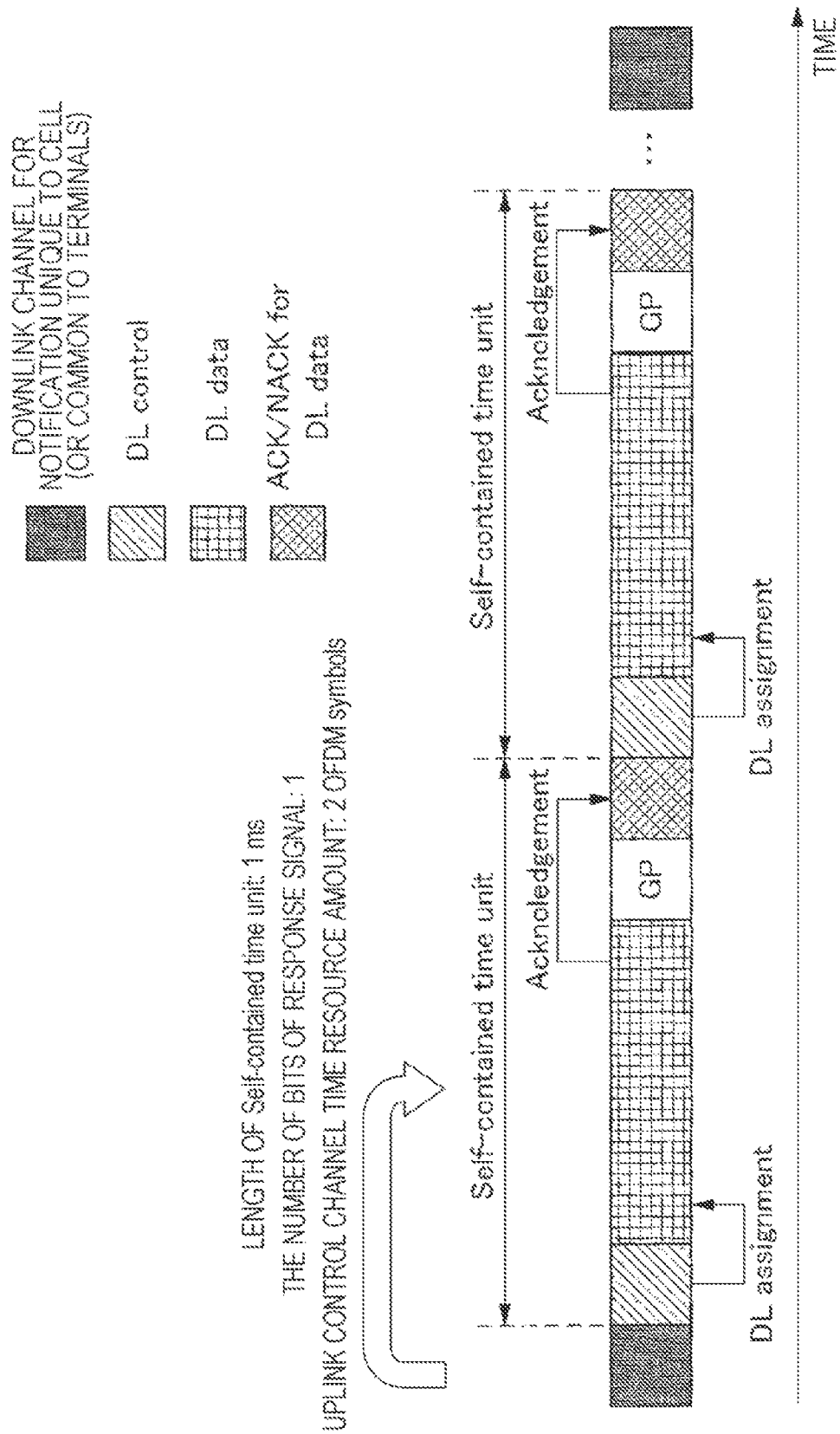

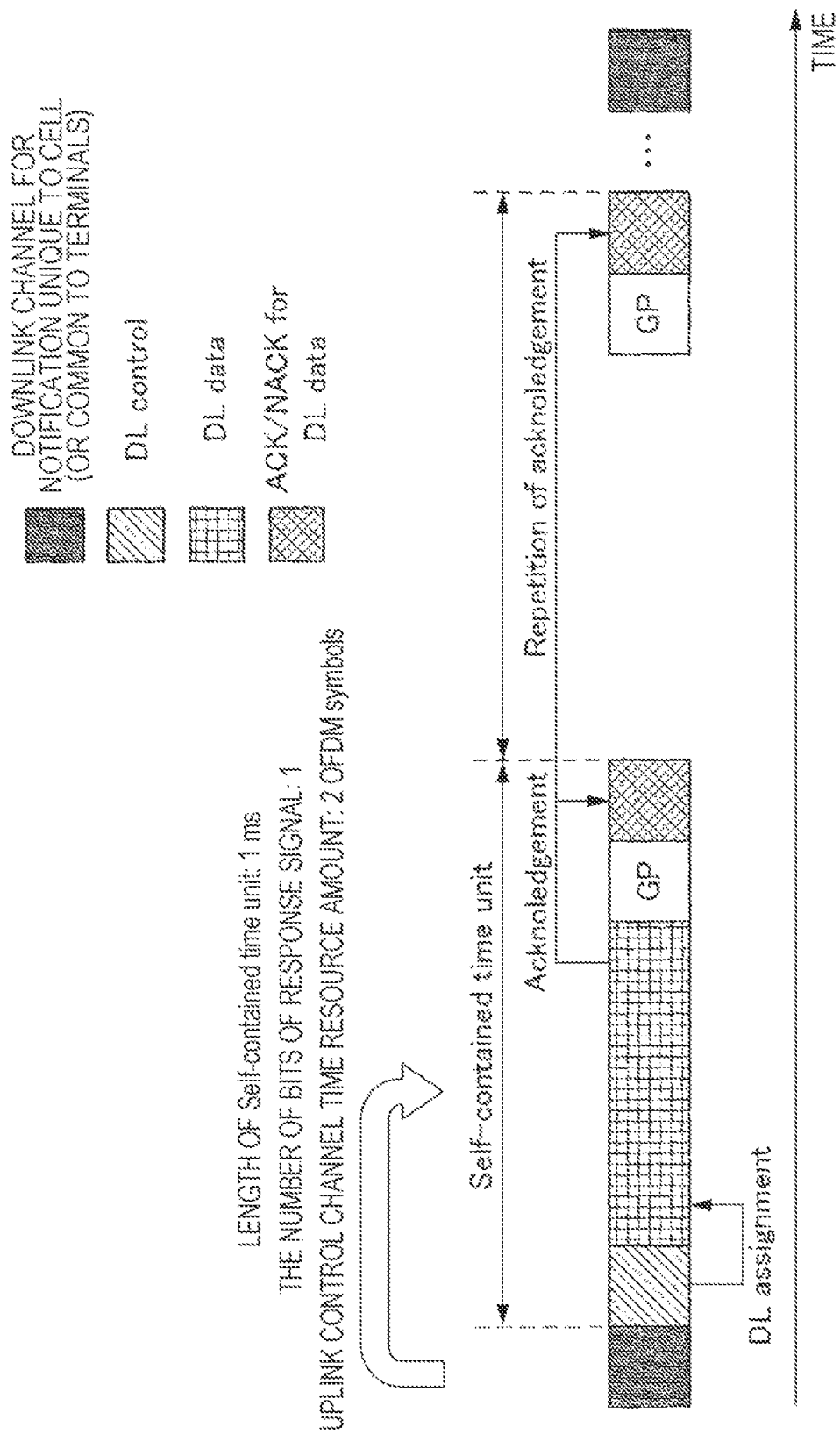

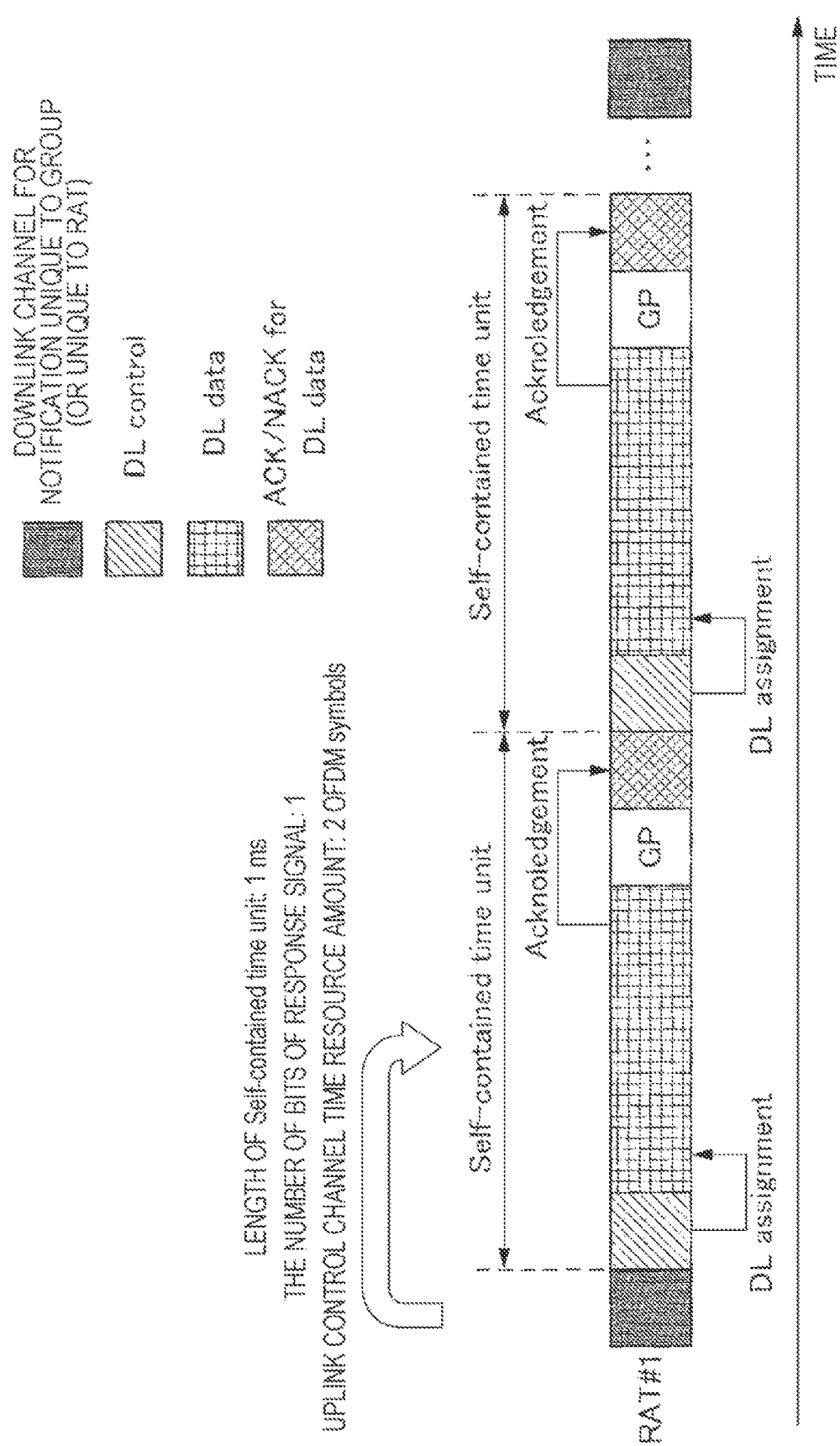

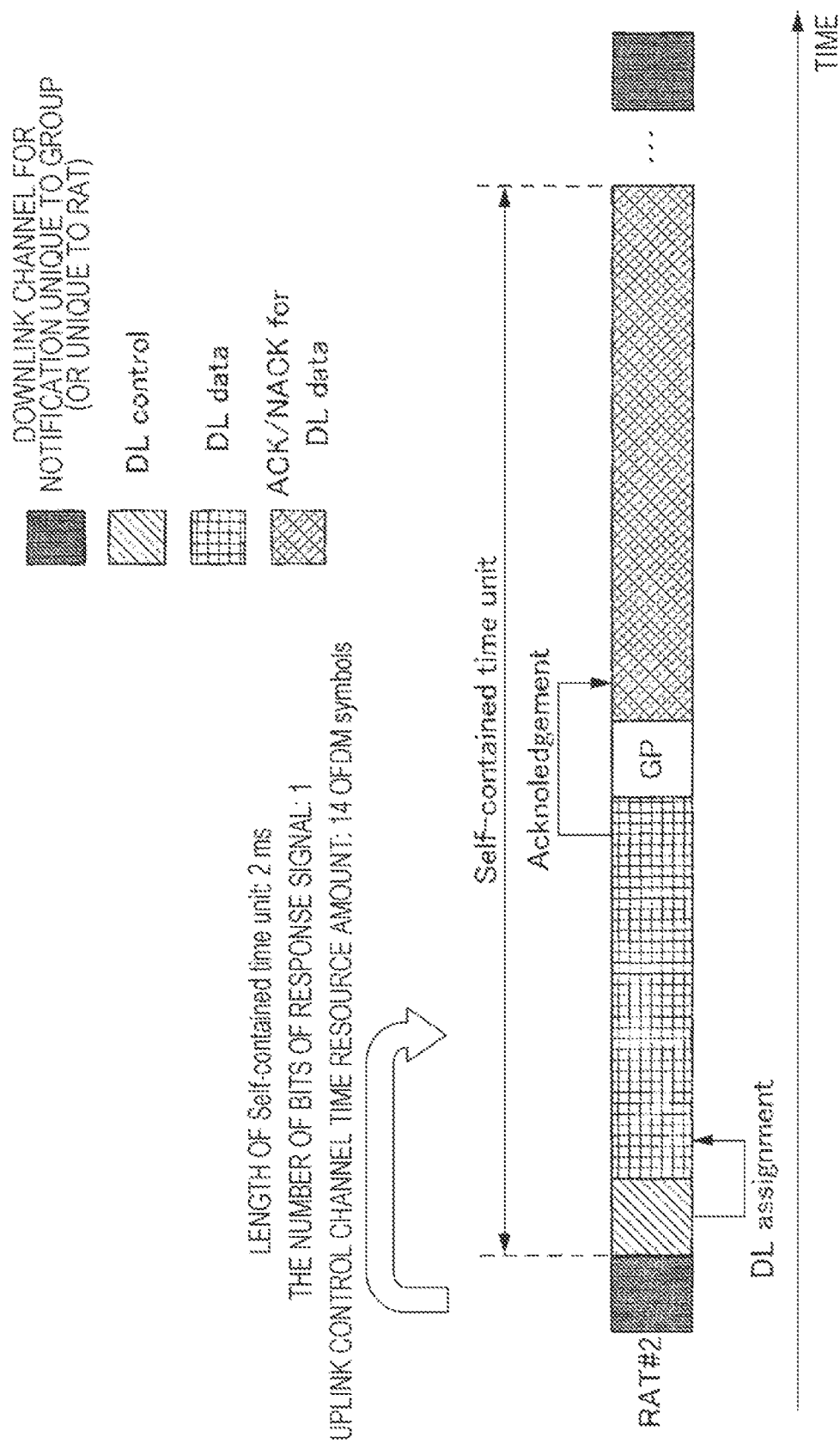

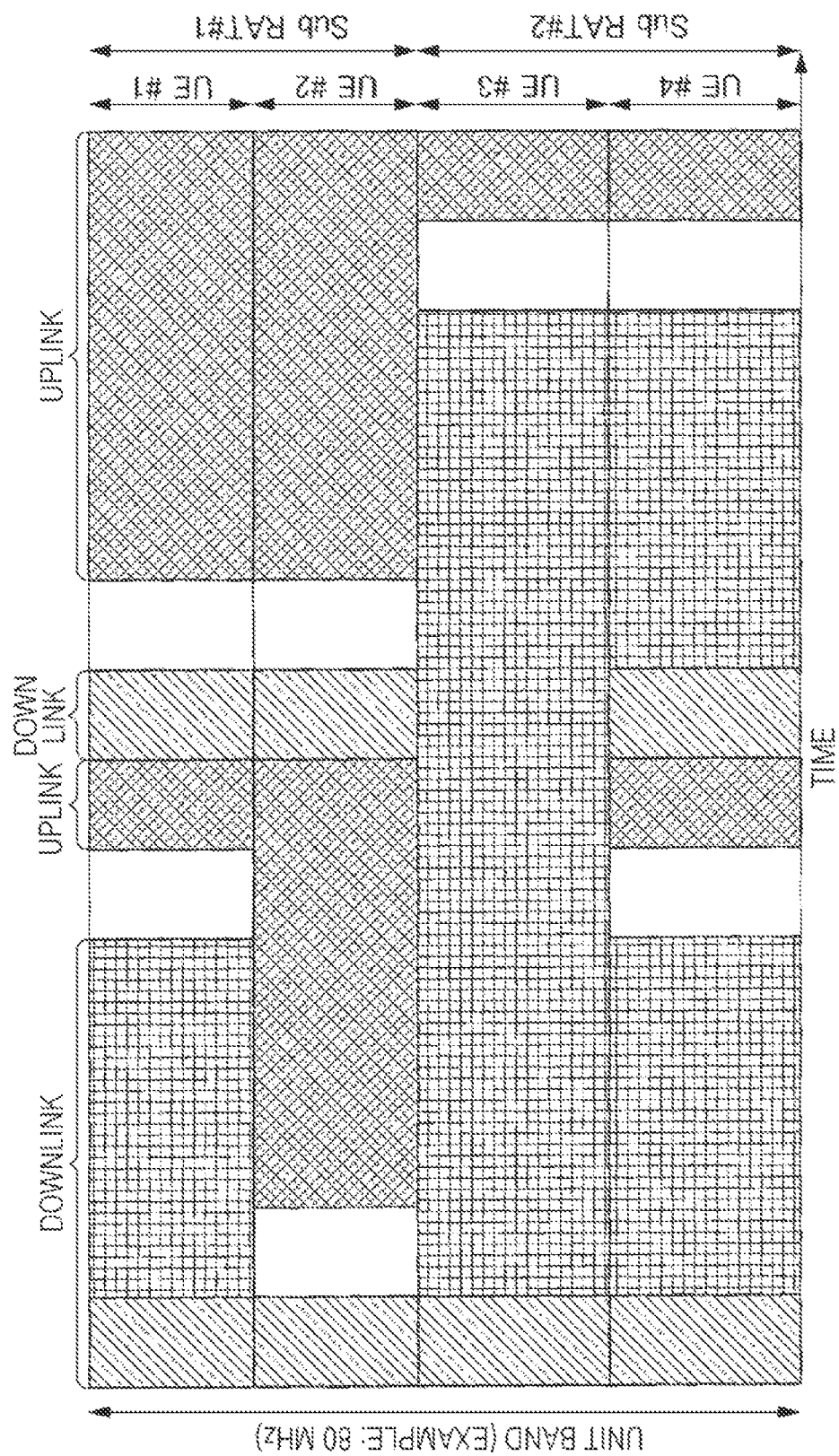

BASE STATION, TERMINAL, AND COMMUNICATION METHOD

TECHNICAL FIELD

The present disclosure relates to a base station, a terminal, and a communication method.

BACKGROUND ART

Through downlink communication in mobile communication, typically, a base station (also referred to as "eNB") transmits a control signal for data reception to a terminal (also referred to as "user equipment (UE)"). The terminal obtains information related to frequency assignment or adaptive control necessary for data reception by decoding control information transmitted to the terminal through the received control signal.

In the mobile communication, typically, a hybrid automatic repeat request (HARQ) is provided to downlink data. Accordingly, the terminal feeds, back to the base station, a response signal indicating a result of error detection in the downlink data.

The following describes, as a conventional technology, operation of the HARQ for downlink data in Long Term Evolution (LTE) standardized by the 3rd Generation Partnership Project (3GPP) (refer to NPLs 1 to 3, for example).

When performing communication in the LTE, a base station assigns a resource block (RB) in a system band to a terminal for each time unit called subframe. The base station transmits control information for data reception by the terminal through a downlink control channel (physical downlink control channel (PDCCH)). The terminal obtains information related to frequency assignment or adaptive control necessary for data reception by decoding the control information transmitted to the terminal through a received PDCCH signal.

In the LTE, a HARQ is provided to downlink data. Accordingly, the terminal feeds, back to the base station, a response signal indicating a result of error detection in the downlink data. The terminal performs cyclic redundancy check (CRC) on the downlink data and feeds, back to the base station, a response signal of positive response (acknowledgement (ACK)) when no error is found in a CRC calculation result, or negative response (negative acknowledgement (NACK)) when error is found in the CRC calculation result. The feedback of the response signal (ACK or NACK) is performed through an uplink control channel (physical uplink control channel (PUCCH)).

In a frequency division duplex (FDD) system of the LTE, the response signal for downlink data is transmitted through a PUCCH resource in a target subframe that is four subframes later than a subframe in which the downlink data is transmitted. In a time division duplex (TDD) system, the response signal for downlink data is transmitted through a PUCCH resource in a target subframe that is four subframes or more later than a subframe in which the downlink data is transmitted.

The PUCCH resource for transmission of the response signal for downlink data in the LTE includes one resource block and one subframe. In the LTE, a plurality of combinations of encoding and modulation methods are available, depending on the number of bits of the response signal (or uplink control information other than the response signal) transmitted through the PUCCH. For example, the PUCCH format 1a is used when there is no control information to be transmitted other than the response signal of one bit and a scheduling request, or the PUCCH forma t 1b is used when there is no control information to be transmitted other than the response signal of two bits and a scheduling request. Alternatively, the PUCCH format 2a/2b is used when transmission of the response signal coincides with feedback of channel state information (CSI) periodically transmitted by uplink.

Data traffic in mobile communication continues exponential increase along with recent spread of service using mobile broadband, and thus it is an urgent task to increase data transmission capacity. In addition, exponential development is expected in the future for Internet of Things (IOT) in which any "things" are connected with each other through the Internet. To achieve service diversification through the IoT, exponential development is required not only for data transmission capacity but also for low latency and various requirements on a communication area (coverage) and the like. For these reasons, technology development and standardization have been made for the 5th generation mobile communication systems (5G) with significantly improved performance and function as compared to those of the 4th generation mobile communication systems (4G).

LTE-Advanced, which is standardized by the 3GPP, is a 4G radio access technology (RAT). In 5G standardization, the 3GPP proceeds development of a new radio access technology (new RAT (NR)) that is not necessarily backward compatible with LTE-Advanced.

In the NR, low latency as one 5G request condition is achieved by a discussed method (refer to NPL 4, for example) of what is called "self-contained" operation in which reception of a downlink control signal necessary for reception of downlink data, reception of the downlink data assigned by the downlink control signal, and feedback of a response signal for the downlink data to a base station are performed in a time unit of a constant time interval (for example, one subframe).

CITATION LIST

Non Patent Literature

NPL 1: 3GPP TS 36.211 V13.1.0, "Evolved Universal Terrestrial Radio Access (E-UTRA); Physical channels and modulation (Release 13)", March 2016.

NPL 2: 3GPP TS 36.212 V13.1.0, "Evolved Universal Terrestrial Radio Access (E-UTRA); Multiplexing and channel coding (Release 13)", March 2016.

NPL 3: 3GPP TS 36.213 V13.0.0, "Evolved Universal Terrestrial Radio Access (E-UTRA); Physical layer procedures (Release 13)", March 2016.

NPL 4: R1-163112, NTT DOCOMO, "Initial views on frame structure for NR access technology", April 2016

SUMMARY OF INVENTION

However, sufficient discussion has not been made on HARQ in the self-contained operation.

According to an aspect, the present disclosure provides a base station, a terminal, and a communication method that enable efficient HARQ in the self-contained operation.

A base station according to an aspect of the present disclosure is a base station including: a control unit configured to determine, when a terminal performs communication in a time unit including a downlink time resource for a downlink control signal, a downlink time resource assigned for downlink data by the downlink control signal, and an uplink time resource for a response signal for the downlink data, the amount of the uplink time resource used by the terminal for transmission of the response signal in accordance with a requested communication area or the number of bits necessary for transmission of the response signal; and a transmission unit configured to transmit time unit information related to the determined amount of the uplink time resource to the terminal.

A terminal according to another aspect of the present disclosure is a terminal configured to perform communication in a time unit including a downlink time resource for a downlink control signal, a downlink time resource assigned for downlink data by the downlink control signal, and an uplink time resource for a response signal for the downlink data, the terminal including: a reception unit configured to receive, from a base station, time unit information related to the amount of the uplink time resource used for transmission of the response signal; and a signal assignment unit configured to assign the response signal for the uplink time resource indicated by the time unit information, in which the amount of the uplink time resource is determined in accordance with the requested communication area or the number of bits necessary for transmission of the response signal.

It should be noted that general or specific embodiments may be implemented as a system, a method, an integrated circuit, a computer program, a storage medium, or any selective combination thereof.

According to an aspect, the present disclosure enables efficient HARQ in a self-contained operation.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 9 is a diagram illustrating the timings of downlink communication and uplink communication according to Embodiment 1.

FIG. 10A is a diagram illustrating an exemplary self-contained operation according to Embodiment 1.

FIG. 10C is a diagram illustrating an exemplary self-contained operation according to Embodiment 1.

FIG. 11B is a diagram illustrating an exemplary self-contained operation according to Embodiment 2.

FIG. 12A is a diagram illustrating an exemplary self-contained operation according to Embodiment 3.

FIG. 12B is a diagram illustrating an exemplary self-contained operation according to Embodiment 3.

FIG. 14A is a diagram illustrating an exemplary self-contained operation according to Embodiment 4.

FIG. 14B is a diagram illustrating an exemplary self-contained operation according to Embodiment 4.

FIG. 15 is a diagram illustrating the timings of downlink communication and uplink communication according to Embodiment 5.

DESCRIPTION OF EMBODIMENTS

[Background of the Present Disclosure]

First, the background of the present disclosure will be described below.

Figure 1:
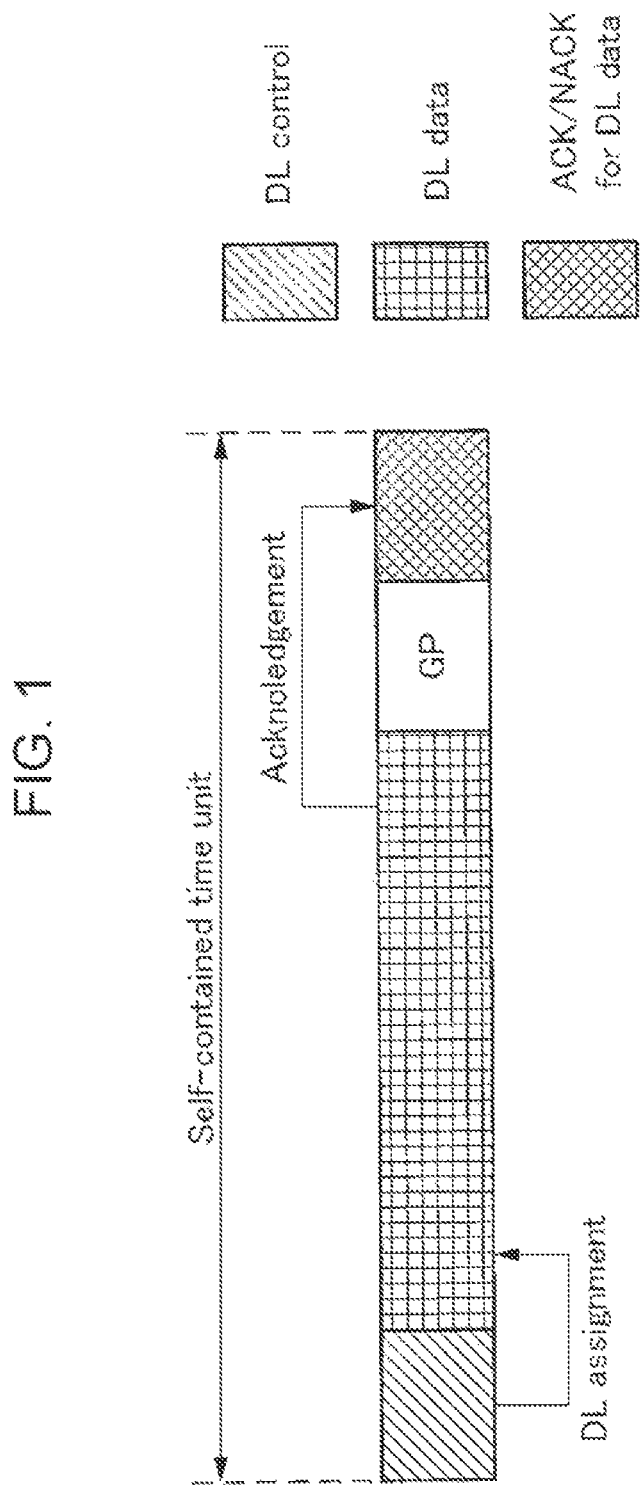
FIG. 1 is a diagram illustrating an exemplary self-contained operation in a TDD system.

FIG. 1 illustrates an exemplary self-contained operation in a TDD system. As illustrated in FIG. 1, a terminal performs, in a time unit (hereinafter referred to as "self-contained time unit") at a constant time interval, reception of a downlink control signal necessary for reception of downlink data, reception of downlink data assigned by the downlink control signal, and feedback of a response signal for the downlink data to a base station. In other words, as illustrated in FIG. 1, the self-contained time unit includes a downlink time resource for a downlink control signal (DL control), a downlink time resource for downlink data (DL data) assigned by the downlink control signal, and an uplink time resource for the response signal for the downlink data (ACK/NACK for DL data).

In the TDD system, a guard period (GP) for switching from downlink communication to uplink communication is provided.

In the self-contained operation, communication with lower latency can be achieved by shortening the self-contained time unit. However, the shortened self-contained time unit leads to reduction of the amount of data that can be transmitted all at once in the self-contained time unit. A time interval in which a relatively large amount of data can be transmitted all at once is needed in usage (such as enhanced mobile broadband (eMBB)) in which large-volume communication is requested.

In addition, when the self-contained time unit is shortened in the TDD system, switching from downlink communication to uplink communication frequently occurs, and the GP needs to be inserted at each switching, which potentially increases the overhead of the GP.

For these reasons, it is desirable for the system to perform control to flexibly change the length of the self-contained time unit. When the length of the self-contained time unit is variable, a HARQ operation in the self-contained time unit can be performed by a plurality of methods as illustrated in FIGS. 2 to 4.

Figure 2:
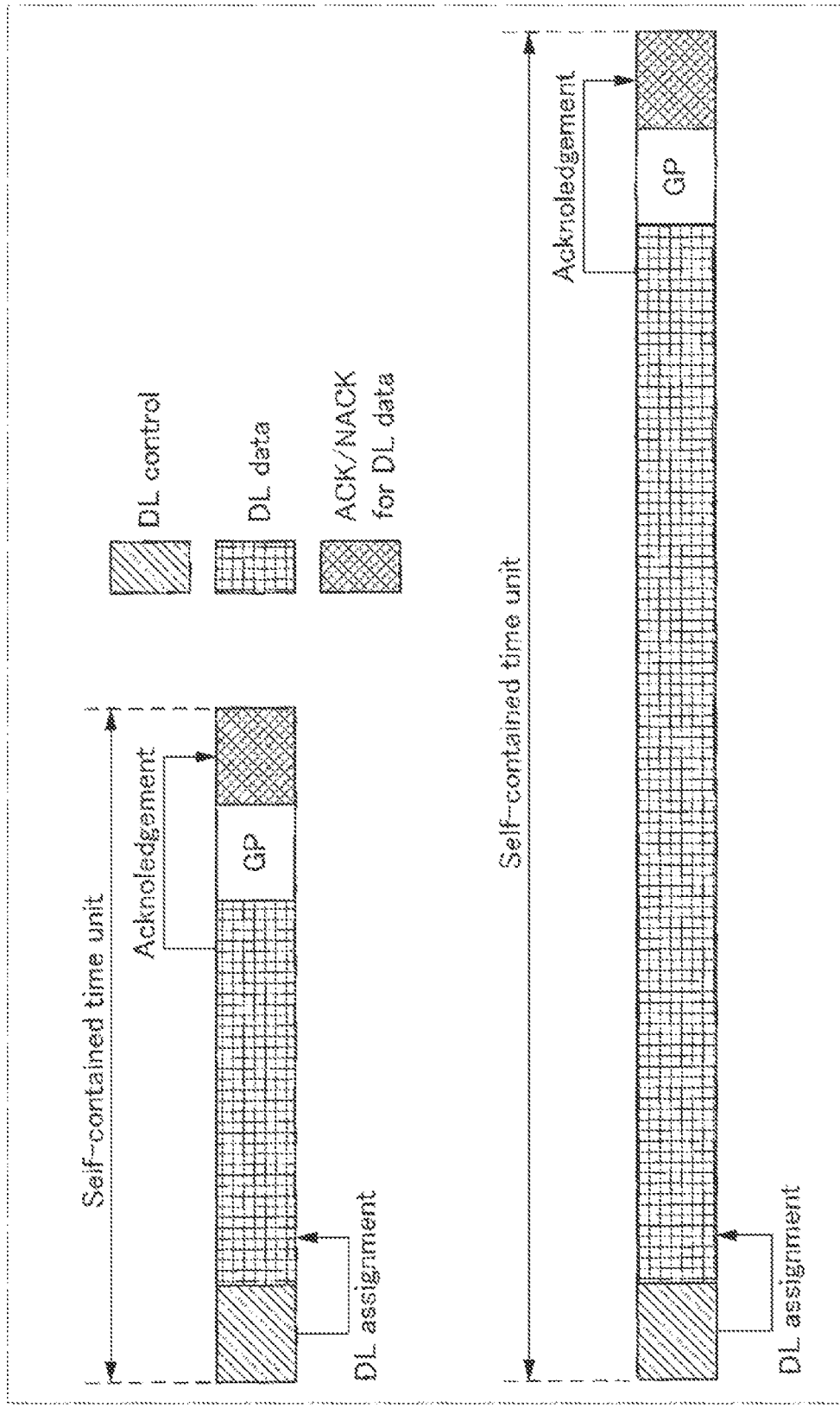
FIG. 2 is a diagram illustrating an exemplary HARQ operation a self-contained time unit.

FIG. 2 illustrates a method of flexibly changing a time interval (time resource) assigned to downlink data. As illustrated in FIG. 2, the self-contained time unit includes single assignment of downlink data through a downlink control channel (DL control), and single transmission of the response signal for the downlink data (ACK/NACK for DL data). In FIG. 2, the number of bits of the response signal transmitted through an uplink control channel does not change with the length of the self-contained time unit. However, the number of bits of the response signal can be increased due to introduction of multiple input multiple output (MIMO) transmission or carrier aggregation (CA). In the HARQ operation illustrated in FIG. 2, overhead reduction can be expected through assignment of large-volume data all at once, and improvement of an encoding gain can be expected through increase of an encoding block size. However, the increase of the encoding block size potentially leads to increase of decoding processing delay and decrease of HARQ efficiency.

Figure 3:
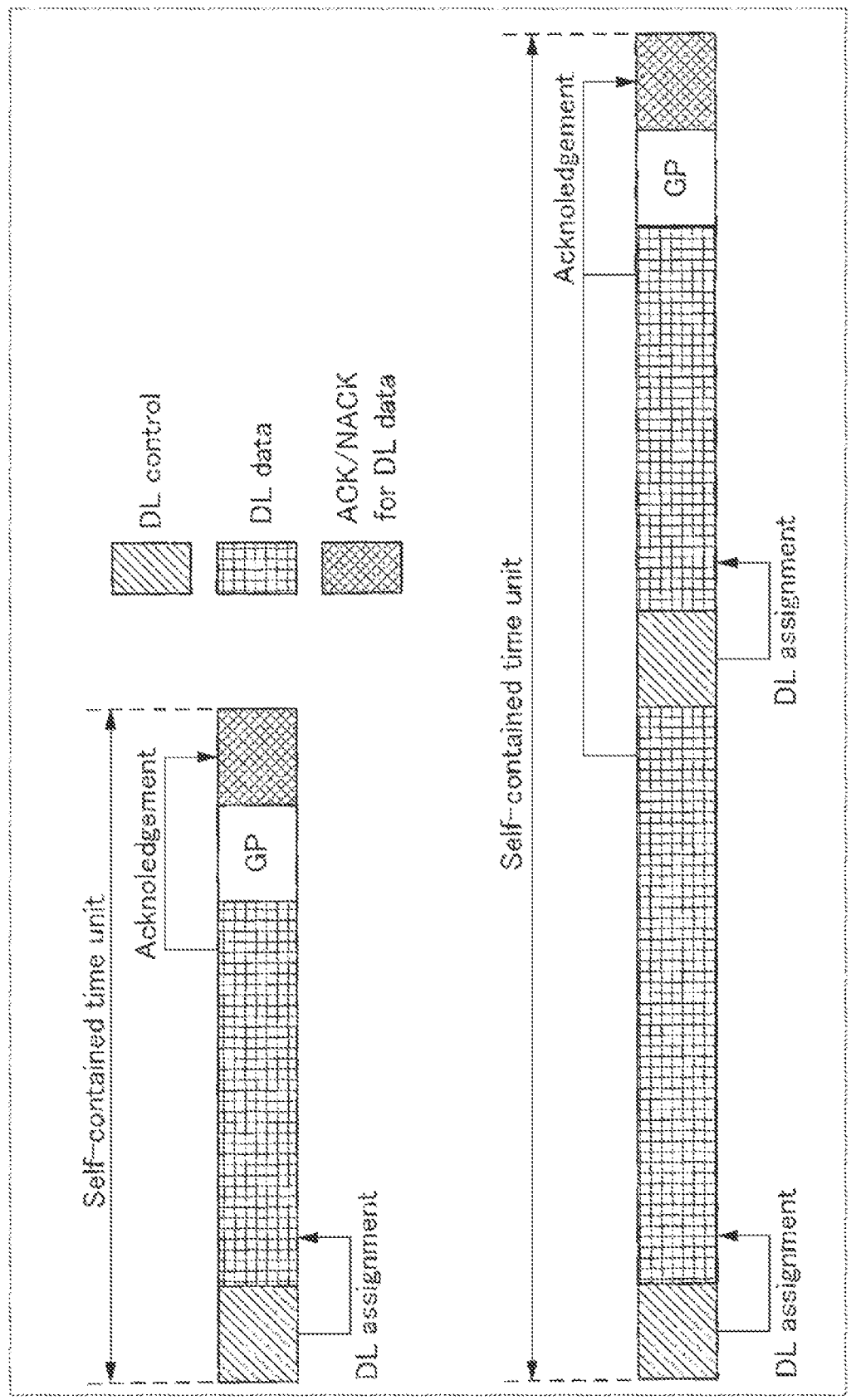
FIG. 3 is a diagram illustrating an exemplary HARQ operation in the self-contained time unit.

FIG. 3 illustrates a method of restricting the time interval assigned to downlink data to a predetermined length. As illustrated in FIG. 3, the self-contained time unit includes a plurality of intervals of downlink data (DL data) assigned through the downlink control channel. The self-contained time unit also includes single transmission of the response signal for the plurality of pieces of downlink data. In this case, the number of bits of the response signal transmitted through the uplink control channel differs with the length of the self-contained time unit. In the HARQ operation illustrated in FIG. 3, decrease of decoding processing delay and improvement of HARQ efficiency can be expected through division of the encoding block size. However, the overhead of data assignment (DL assignment) is potentially increased.

Figure 4:
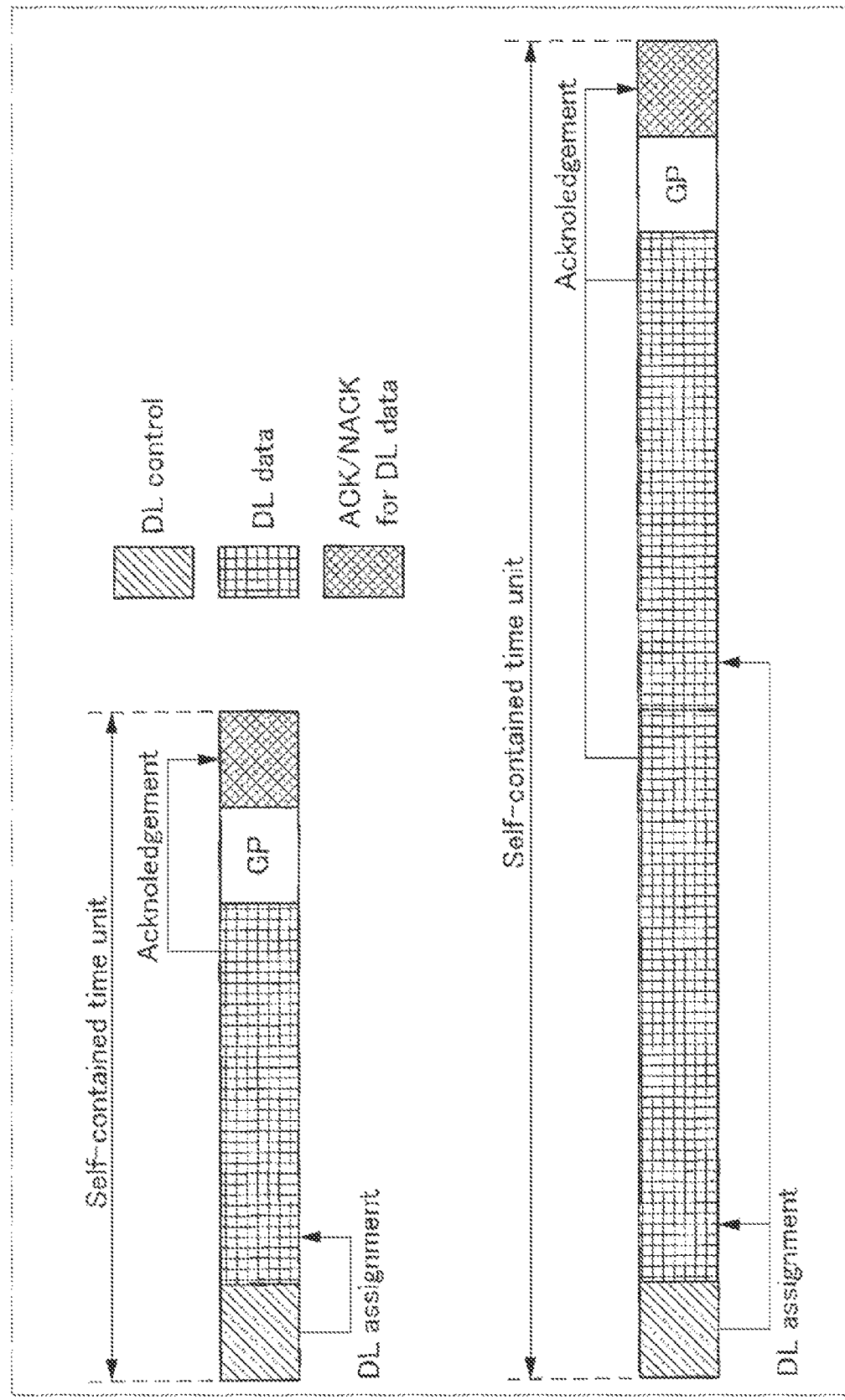
FIG. 4 is a diagram illustrating an exemplary HARQ operation in the self-contained time unit.

Similarly to FIG. 3, FIG. 4 illustrates a method of restricting a time interval assigned to downlink data to a predetermined length. However, FIG. 4 illustrates a case in which the self-contained time unit includes assignment of a plurality of pieces of downlink data through one downlink control channel. The self-contained time unit also includes single transmission of the response signal for the plurality of pieces of downlink data. In the case of FIG. 4, similarly to FIG. 3, the number of bits of the response signal transmitted through the uplink control channel differs with the length of the self-contained time unit. In the HARQ operation illustrated in FIG. 4, similarly to FIG. 3, decrease of decoding processing delay and improvement of HARQ efficiency can be expected through division of the encoding block size. However, since the plurality of pieces of downlink data need to be assigned in one downlink control signal, the number of bits of the downlink control signal potentially increases.

As described above, the HARQ operation is performed by various methods when the length of the self-contained time unit is flexibly changed, and a suitable method of the HARQ operation differs in accordance with the capacities of transmission and reception devices or a service request condition. Thus, it is desirable to design a system that allows flexible change of the length of the self-contained time unit as well as flexible change of the method of the HARQ operation. However, in such a case, the number of bits of the response signal transmitted through the uplink control channel changes, depending on the length of the self-contained time unit or the method of the HARQ operation.

In LTE, a plurality of combinations (PUCCH formats) of encoding and modulation methods are available, depending on the number of bits of the response signal (or uplink control information other than the response signal) transmitted through the PUCCH. In the LTE, bundling or multiplexing is performed in, for example, a TDD system when the response signal for each of a plurality of pieces of downlink data is collectively fed back. However, the bundling or multiplexing assumes transmission of the response signal through fixed PUCCH resources (one resource block and one subframe).

However, in 5G, service that satisfies low latency or various request conditions on a communication area and the like needs to be supported to achieve service diversification. For example, when the length of the self-contained time unit is shortened, communication with lower latency can be achieved, but a sufficient communication area (communication area of uplink communication, in particular) cannot be obtained due to reduction of time resources for communication. Expansion of the communication area as compared to an LTE-Advanced case is considered in a 5G request condition, and thus it is necessary to not only change the length of the self-contained time unit but also flexibly change the uplink time resource for transmission of the response signal for downlink data in the self-contained time unit.

As described above, when the length of the self-contained time unit is flexibly changed, the method of the HARQ operation is flexibly changed, and the uplink time resource for transmission of the response signal for downlink data in the self-contained time unit is flexibly changed, the uplink time resource for transmission of the response signal for downlink data in the self-contained time unit potentially cannot be controlled appropriately by the existing plurality of combinations of LTE encoding and modulation methods on the assumption of transmission of the response signal through fixed PUCCH resources (one resource block and one subframe), and by the existing bundling or multiplexing.

Thus, an aspect of the present disclosure is intended to appropriately control the uplink time resource for transmission of the response signal for downlink data in the self-contained time unit when the length of the self-contained time unit in the self-contained operation is flexibly changed.

Embodiments of the present disclosure will be described below in detail with reference to the accompanying drawings.

Embodiment 1

[Outline of Communication System]

A communication system according to each embodiment of the present disclosure includes a base station 100 and a terminal 200.

Figure 5:
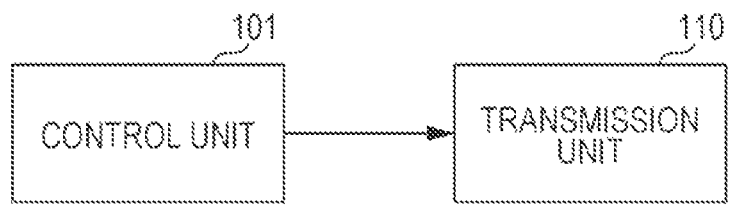
FIG. 5 is a block diagram illustrating a main part configuration of a base station according to Embodiment 1.

FIG. 5 is a block diagram illustrating a main part configuration of the base station 100 according to each embodiment of the present disclosure. In the base station 100 illustrated in FIG. 5, when the terminal 200 performs communication in a time unit (self-contained time unit) including a downlink time resource for a downlink control signal, a downlink time resource for downlink data assigned by the downlink control signal, and an uplink time resource for the response signal for the downlink data, a control unit 101 determines the amount of the uplink time resource used for transmission of the response signal in accordance with a requested communication area or the number of bits necessary for transmission of the response signal, and a transmission unit 110 transmits time unit information related to the determined amount of the uplink time resource to the terminal 200.

Figure 6:
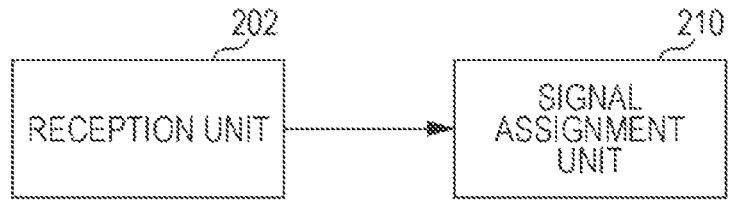
FIG. 6 is a block diagram illustrating a main part configuration of a terminal according to Embodiment 1.

FIG. 6 is a block diagram illustrating a main part configuration of the terminal 200 according to each embodiment of the present disclosure. The terminal 200 illustrated in FIG. 6 performs communication in a time unit including a downlink time resource for a downlink control signal, a downlink time resource for downlink data assigned by the downlink control signal, and an uplink time resource for the response signal for the downlink data. In the terminal 200, a reception unit 202 receives, from the base station 100, time unit information related to the amount of the uplink time resource used for transmission of the response signal, and a signal assignment unit 210 assigns the response signal to the uplink time resource based on the time unit information. The amount of the uplink time resource is determined in accordance with the requested communication area or the number of bits necessary for transmission of the response signal.

[Configuration of Base Station]

Figure 7:
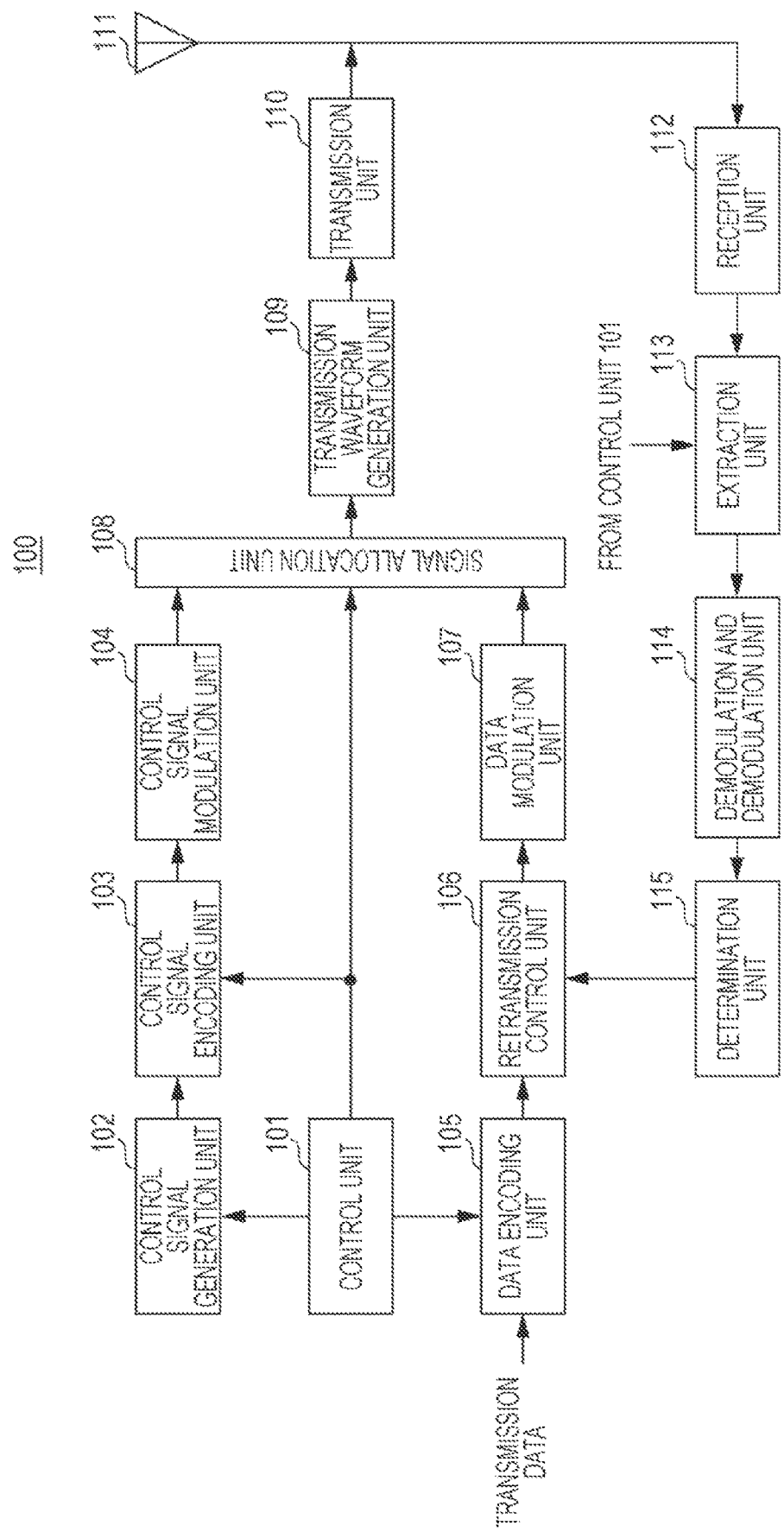
FIG. 7 is a block diagram illustrating the configuration of the base station according to Embodiment 1.

FIG. 7 is a block diagram illustrating the configuration of the base station 100 according to Embodiment 1 of the present disclosure. In FIG. 7, the base station 100 includes the control unit 101, a control signal generation unit 102, a control signal encoding unit 103, a control signal modulation unit 104, a data encoding unit 105, a retransmission control unit 106, a data modulation unit 107, a signal assignment unit 108, a transmission waveform generation unit 109, the transmission unit 110, an antenna 111, a reception unit 112, an extraction unit 113, a demodulation and decoding unit 114, and a determination unit 115.

The control unit 101 determines the length of a self-contained time unit for the terminal 200, the number of bits of the response signal transmitted through the uplink control channel in the self-contained time unit, and the time resource amounts of the uplink control channel for transmission of the response signal for downlink data in the self-contained time unit. The control unit 101 outputs information (corresponding to time unit information) related to the self-contained time unit including the determined parameters to the control signal generation unit 102. The control unit 101 also outputs, to the extraction unit 113, information indicating the time resource amounts of the uplink control channel for transmission of the response signal for downlink data in the self-contained time unit. A method performed by the control unit 101 to determine information related to the self-contained time unit will be described later in detail.

The control unit 101 determines assignment of downlink data to the terminal 200. In this case, the control unit 101 determines, for example, a frequency assignment resource and a modulation and encoding method to be instructed to the terminal 200, and outputs information (downlink assignment information) related to the determined parameters to the control signal generation unit 102.

The control unit 101 determines resources (time, frequency, code sequence, and the like) with which the terminal 200 transmits the response signal, and outputs information related to the determined parameters to the control signal generation unit 102. The control unit 101 outputs, to the extraction unit 113, information indicating resources with which the terminal 200 transmits the response signal. All or part of the information related to resources with which the terminal 200 transmits the response signal may be implicitly notified to the terminal 200 by the base station 100, or may be notified to the terminal 200 (control unit 207 to be described later) by a UE-specific higher layer signaling.

The control unit 101 determines a coding level of a control signal, and outputs the determined coding level to the control signal encoding unit 103. The control unit 101 determines a radio resource (downlink resource) to which the control signal is mapped, and outputs information related to the determined radio resource to the signal assignment unit 108. The control unit 101 determines a coding level of transmission data (downlink data), and outputs the determined coding level to the data encoding unit 105.

The control signal generation unit 102 generates a control signal to the terminal 200. The control signal includes a cell-specific higher layer signaling, a group-specific or RAT-specific higher layer signaling, a UE-specific higher layer signaling, and downlink assignment information instructing downlink data assignment.

The downlink assignment information is made of a plurality of bits, and includes information instructing a frequency assignment resource, a modulation and coding scheme, and the like. Additionally, the downlink assignment information may include the above-described information related to the length of the self-contained time unit, the number of bits of the response signal transmitted through the uplink control channel in the self-contained time unit, the time resource amounts of the uplink control channel for transmission of the response signal for downlink data in the self-contained time unit, and resources (time, frequency, code sequence, and the like) with which the terminal 200 transmits the response signal.

The control signal generation unit 102 generates a bit string of control information by using control information input from the control unit 101, and outputs the generated control information bit string (control signal) to the control signal encoding unit 103. The control information is transmitted to a plurality of terminals 200 in some cases, and thus the control signal generation unit 102 may generate, for each terminal 200, a bit string of control information including information, such as the terminal ID of the terminal 200, with which the terminal can be identified.

The control signal encoding unit 103 encodes the control signal (control information bit string) received from the control signal generation unit 102 in accordance with the coding level instructed by the control unit 101, and outputs the encoded control signal to the control signal modulation unit 104.

The control signal modulation unit 104 modulates the control signal received from the control signal encoding unit 103, and outputs the modulated control signal (symbol string) to the signal assignment unit 108.

The data encoding unit 105 performs error correction coding on transmission data (downlink data) in accordance with the coding level received from the control unit 101, and outputs a data signal obtained by the encoding to the retransmission control unit 106.

At transmission for the first time, the retransmission control unit 106 holds the coded data signal received from the data encoding unit 105, and outputs the coded data signal to the data modulation unit 107. When having received a NACK for a transmitted data signal from the determination unit 115 to be described later, the retransmission control unit 106 outputs corresponding held data to the data modulation unit 107. When having received an ACK to transmitted data, the retransmission control unit 106 deletes corresponding held data.

The data modulation unit 107 modulates the data signal received from the retransmission control unit 106, and outputs the modulated data signal to the signal assignment unit 108.

The signal assignment unit 108 maps, to the radio resource instructed by the control unit 101, the control signal (symbol string) received from the control signal modulation unit 104 and the modulated data signal received from the data modulation unit 107. The signal assignment unit 108 outputs a downlink signal to which the signals are mapped to the transmission waveform generation unit 109.

The transmission waveform generation unit 109 performs transmission waveform generation processing such as orthogonal frequency division multiplexing (OFDM) modulation on the signal received from the signal assignment unit 108.

The transmission unit 110 performs radio frequency (RF) processing such as digital-to-analog (D/A) conversion and up-conversion on a signal received from the transmission waveform generation unit 109, and transmits a radio signal to the terminal 200 through the antenna 111.

The reception unit 112 performs RF processing such as down-conversion or analog-to-digital (A/D) conversion on the waveform of the response signal for an uplink signal received from the terminal 200 through the antenna 111, and outputs a received signal thus obtained to the extraction unit 113.

The extraction unit 113 extracts a radio resource part with which an uplink the response signal is transmitted, from the received signal based on the resources (time, frequency, code sequence, and the like) with which the terminal 200 transmits the response signal and the information indicating the time resource amounts of the uplink control channel for transmission of the response signal for downlink data in the self-contained time unit, which are received from the control unit 101, and outputs a reception the response signal to the demodulation and decoding unit 114.

The demodulation and decoding unit 114 performs equalization, demodulation, and decoding on the reception the response signal received from the extraction unit 113, and outputs a bit sequence obtained through the decoding to the determination unit 115.

The determination unit 115 determines whether the response signal transmitted from the terminal 200 indicates any of ACK and NACK to transmitted downlink data based on the bit sequence input from the demodulation and decoding unit 114. The determination unit 115 outputs a result of the determination to the retransmission control unit 106.

[Configuration of Terminal]

Figure 8:
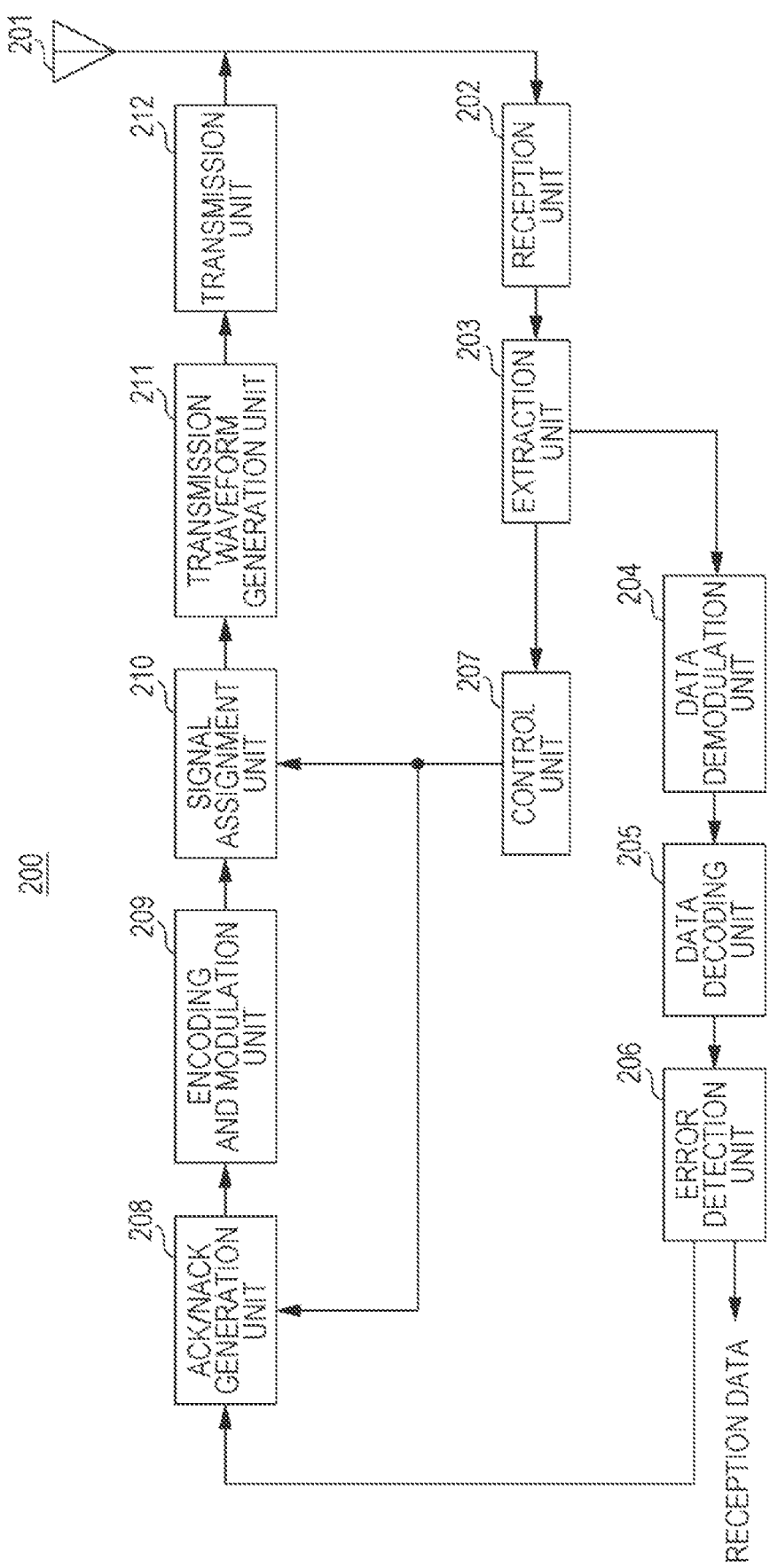
FIG. 8 is a block diagram illustrating the configuration of the terminal according to Embodiment 1.

FIG. 8 is a block diagram illustrating the configuration of the terminal 200 according to Embodiment 1 of the present disclosure. In FIG. 8, the terminal 200 includes an antenna 201, the reception unit 202, an extraction unit 203, a data demodulation unit 204, a data decoding unit 205, an error detection unit 206, a control unit 207, an ACK/NACK generation unit 208, an encoding and modulation unit 209, the signal assignment unit 210, a transmission waveform generation unit 211, and a transmission unit 212.

The reception unit 202 receives, through the antenna 201, a control signal and a data signal transmitted from the base station 100, and obtains a baseband signal by performing RF processing such as down-conversion or AD conversion on a wireless received signal. The reception unit 202 outputs the signal to the extraction unit 203.

The extraction unit 203 extracts a control signal from the signal received from the reception unit 202. Then, the extraction unit 203 tries decoding of a control signal targeted to the terminal 200 by performing blind decoding on the control signal. When having determined through the blind decoding that the control signal is targeted to the terminal 200, the extraction unit 203 outputs the control signal to the control unit 207. The extraction unit 203 also extracts downlink data from the signal received from the reception unit 202, and outputs the extracted downlink data to the data demodulation unit 204.

The data demodulation unit 204 demodulates the downlink data received from the extraction unit 203, and outputs the demodulated downlink data to the data decoding unit 205.

The data decoding unit 205 decodes the downlink data received from the data demodulation unit 204, and outputs the decoded downlink data to the error detection unit 206.

The error detection unit 206 performs error detection on the downlink data received from the data decoding unit 205, and outputs a result of the error detection to the ACK/NACK generation unit 208. The error detection unit 206 outputs, as reception data, downlink data determined to have no error through the error detection.

The control unit 207 controls transmission of an uplink control signal (in this example, the response signal) based on the control signal input from the extraction unit 203. Specifically, the control unit 207 specifies resources (time, frequency, code sequence, and the like) with which the response signal is transmitted based on the time resource amounts of the uplink control channel for transmission of the response signal for downlink data in the self-contained time unit and information related to the resources (time, frequency, code sequence, and the like) with which the response signal is transmitted, and outputs information related to the specified resources to the signal assignment unit 210.

The control unit 207 outputs, to the ACK/NACK generation unit 208, information related to the number of bits of the response signal transmitted through the uplink control channel in the self-contained time unit.

The ACK/NACK generation unit 208 generates the response signal (bit sequence) for received downlink data by using the error detection result received from error detection unit 207 based on the information related to the number of bits of the response signal, which is received from the control unit 207, and outputs the response signal to the encoding and modulation unit 209.

The encoding and modulation unit 209 performs error correction coding on the response signal (bit sequence) received from the ACK/NACK generation unit 208, modulates a bit sequence obtained through the encoding, and outputs a symbol sequence obtained through the modulation to the signal assignment unit 210.

The signal assignment unit 210 maps a signal received from the encoding and modulation unit 209 to an uplink time resource assigned in the self-contained time unit in accordance with instruction from the control unit 207.

The transmission waveform generation unit 211 performs transmission waveform generation processing such as OFDM modulation on the signal input from the signal assignment unit 210.

The transmission unit 212 performs RF processing such as D/A conversion and up-conversion on a signal received from the transmission waveform generation unit 211, and transmits a radio signal to the base station 100 through the antenna 201.

[Operations of the Base Station 100 and the Terminal 200]

The following describes operations of the base station 100 and the terminal 200 having the above-described configurations in detail.

The present embodiment describes a TDD system in which the timings of downlink communication and uplink communication coincide with each other in a unit band (also referred to as component carrier(s)) as illustrated in FIG. 9.

The base station 100 notifies information related to the length of the self-contained time unit to the terminal 200 through a downlink channel for cell-specific notification (or common to terminals). For example, cell-specific notification (or common to terminals) and related to the length of the self-contained time unit is periodically transmitted in a fixed DL subframe disclosed in NPL 4. Accordingly, the notification in each fixed DL subframe determines the length of the self-contained time unit for a radio resource until the next fixed DL subframe.

The base station 100 also notifies, to the terminal 200 through the downlink channel for cell-specific notification (or common to terminals), information related to the number of bits of the response signal transmitted through the uplink control channel in the self-contained time unit.

For example, cell-specific notification (or common to terminals) and related to the number of bits of the response signal is periodically transmitted in a fixed DL subframe disclosed in NPL 4. Accordingly, the notification in each fixed DL subframe determines the number of bits of the response signal in the self-contained time unit for a radio resource until the next fixed DL subframe.

The base station 100 notifies, to the terminal 200 through the downlink channel for cell-specific notification (or common to terminals), information related to the time resource of the uplink control channel for transmission of the response signal for downlink data in the self-contained time unit. For example, cell-specific notification (or common to terminals) and related to the time resource of the uplink control channel for transmission of the response signal is periodically transmitted in a fixed DL subframe disclosed in NPL 4. Accordingly, the indication in each fixed DL subframe determines the time resource amount of the uplink control channel for transmission of the response signal in the self-contained time unit for a radio resource until the next fixed DL subframe.

The base station 100 determines the time resource amounts of the uplink control channel for transmission of the response signal for downlink data in the self-contained time unit based on the number of bits of the response signal, a condition requested for a communication area (requested coverage) to be supported by a cell, or both information.

For example, the base station 100 sets, for a larger requested communication area, a larger time resource amount of the uplink control channel in the self-contained time unit, and sets a smaller time resource amount of the uplink control channel in the self-contained time unit for a smaller requested communication area (in other words, when a large communication area is not requested).

Alternatively, the base station 100 sets, for a larger number of bits of the response signal, a larger time resource amount of the uplink control channel in the self-contained time unit, and sets, for a smaller number of bits of the response signal, a smaller time resource amount of the uplink control channel in the self-contained time unit.

The terminal 200 receives information related to the length of the self-contained time unit, information related to the number of bits of the response signal transmitted through the uplink control channel in the self-contained time unit, and the time resource amounts of the uplink control channel for transmission of the response signal for downlink data in information related to the self-contained time unit, which are notified through the downlink channel for cell-specific notification (or common to terminals), from the base station 100, and specifies resources of the self-contained time unit based on received control information.

Then, the terminal 200 receives downlink data (DL data) based on downlink assignment information notified through the downlink channel in the self-contained time unit, assigns the response signal for the downlink data (ACK/NACK for DL data) to the time resource of the uplink control channel for transmission of the response signal, and transmits the response signal to the base station 100.

Figure 10B:
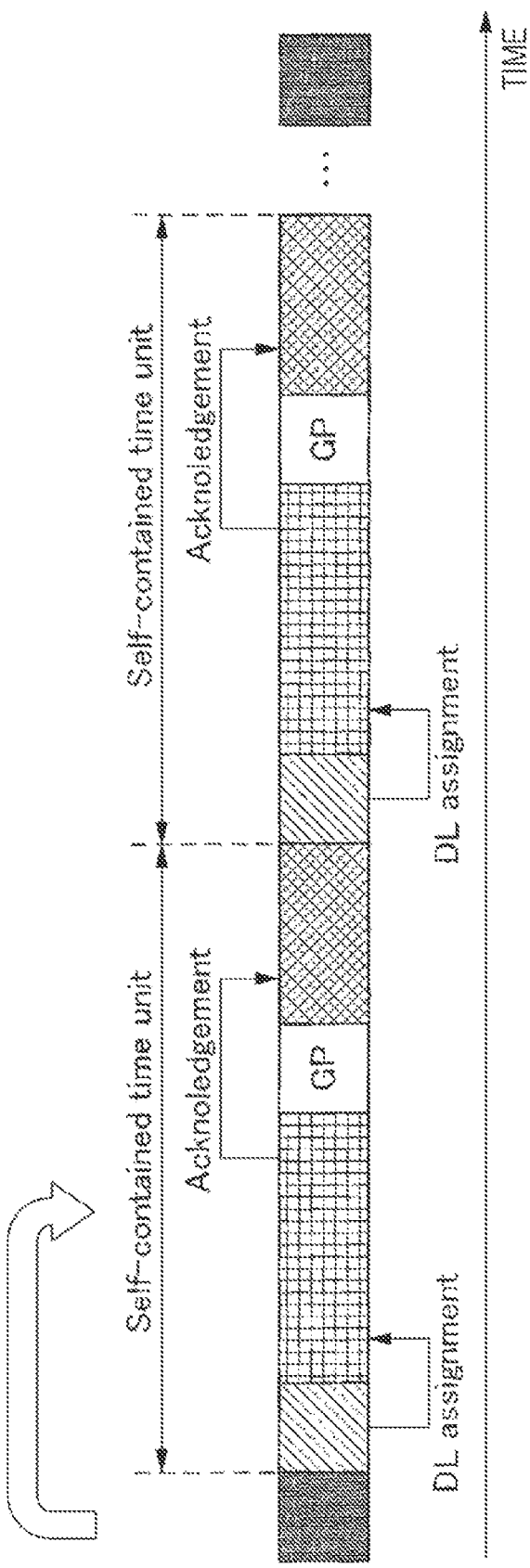
FIG. 10B is a diagram illustrating an exemplary self-contained operation according to Embodiment 1.

FIGS. 10A to 10C each illustrate exemplary self-contained operation according to the present embodiment.

First, the base station 100 notifies, to the terminal 200 through the downlink channel for cell-specific notification (or common to terminals), the length of the self-contained time unit, the number of bits of the response signal transmitted through the uplink control channel in the self-contained time unit, and the time resource amount of the uplink control channel in the self-contained time unit.

For example, the length of the self-contained time unit is 1 ms in FIG. 10A, 1 ms in FIG. 10B, and 2 ms in FIG. 10C.

The number of bits of the response signal is 1 bit in FIGS. 10A to 10C.

The time resource amount of the uplink control channel is 2 OFDM symbol in FIG. 10A, 4 OFDM symbol in FIG. 10B, and 14 OFDM symbol in FIG. 10C.

In FIG. 10B, as compared to FIG. 10A, the length of the self-contained time unit is equal, and the time resource amount of the uplink control channel is larger. In FIG. 10C, as compared to FIGS. 10A and 10B, the length of the self-contained time unit is larger, and the time resource amount of the uplink control channel is larger.

The length of the self-contained time unit and the time resource amount of the uplink control channel may have granularity in units of OFDM symbols or in units of subframes each made of a plurality of OFDM symbols. The granularity of the length of the self-contained time unit may differ from the granularity of the time resource amount of the uplink control channel. In the present embodiment, the length of the self-contained time unit and the time resource amount of the uplink control channel are individually notified in the downlink channel for cell-specific notification (or common to terminals).

For example, when lower latency is requested and a small communication area (coverage) is requested (no large communication area is needed) for a cell of the base station 100, the base station 100 sets, to the terminal 200, a short length of the self-contained time unit and the time resource of the uplink control channel made of a small number of OFDM symbols as illustrated in FIG. 10A. Accordingly, the terminal 200 can transmit the response signal with low latency while maintaining the needed communication area.

When low latency is requested and a larger communication area (coverage) is requested (a relatively large communication area needs to be supported) for the cell of the base station 100, the base station 100 sets, to the terminal 200, a short length of the self-contained time unit and an increased fraction of the time resource of the uplink control channel in the self-contained time unit as illustrated in FIG. 10B. Accordingly, the terminal 200 transmits, with low latency equivalent to that in FIG. 10A, the response signal through the time resource of the uplink control channel made of OFDM symbols in a number larger than that in FIG. 10A (in other words, with sufficient transmission electric power), thereby achieving a large communication area.

When increase of the communication area is prioritized over low latency for the cell of the base station 100, the base station 100 sets, to the terminal 200, a longer length of the self-contained time unit and an increased time resource amount of the uplink control channel as illustrated in FIG. 10C. Accordingly, as compared to FIG. 10A or 10B, the terminal 200 transmits, with large latency, the response signal through the time resource of the uplink control channel made of a further large number of OFDM symbols (with sufficient transmission electric power), thereby achieving a large communication area.

In this manner, in the present embodiment, the base station 100 determines the time resource amount of the uplink control channel in the self-contained time unit in accordance with a communication area (coverage requirement) requested for a cell.

In this case, the base station 100 determines the time resource amount of the uplink control channel independently from a set length of the self-contained time unit.

In other words, the base station 100 can independently control, through cell-specific notification (or common to terminals), the time resource amount of the uplink control channel in the self-contained time unit in addition to the length of the self-contained time unit. Accordingly, the base station 100 can appropriately control the time resource amount of the uplink control channel in accordance with a HARQ operation or a condition requested for a communication area to be supported by a cell.

With the configuration described above, in the present embodiment, HARQ can be efficiently performed in a self-contained operation.

In the present embodiment, the number of bits of the response signal does not necessarily need to be explicitly notified to the terminal 200 through cell-specific notification (or common to users). In such a case, the terminal 200 may determine the number of bits of the response signal based on a result of decoding a downlink control signal to which downlink data is assigned or a result of decoding the downlink data.

Embodiment 2

Embodiment 1 describes the case in which the time resource amount of the uplink control channel in the self-contained time unit is determined independently from the length of the self-contained time unit. However, the present embodiment describes a case in which the time resource amount of the uplink control channel in the self-contained time unit is determined in accordance with the length of the self-contained time unit.

A base station and a terminal according to the present embodiment have basic configurations same as those of the base station 100 and the terminal 200 according to Embodiment 1, and thus will be described below with reference to FIGS. 7 and 8.

Similarly to Embodiment 1, the present embodiment describes a TDD system in which the timings of downlink communication and uplink communication coincide with each other in a unit band as illustrated in FIG. 9.

Similarly to Embodiment 1, the base station 100 notifies to the terminal 200 through the downlink channel for cell-specific notification(or common to terminals), information related to the length of the self-contained time unit and information related to the number of bits of the response signal transmitted through the uplink control channel in the self-contained time unit. For example, cell-specific notification (or common to terminals) and related to the length of the self-contained time unit and the number of bits of the response signal is periodically transmitted in a fixed DL subframe disclosed in NPL 4. Accordingly, the notification in each fixed DL subframe determines the length of the self-contained time unit and the number of bits of the response signal for a radio resource until the next fixed DL subframe.

In the present embodiment, the base station 100 implicitly notifies, to the terminal 200, information related to the time resource of the uplink control channel for transmission of the response signal for downlink data in the self-contained time unit in association with the length of the self-contained time unit. In this case, the base station 100 determines the time resource amount of the uplink control channel for transmission of the response signal for downlink data in the self-contained time unit based on the number of bits of the response signal, a condition requested for a communication area to be supported by a cell, or both information. The base station 100 also determines the length of the self-contained time unit based on the number of bits of the response signal, a condition requested for a communication area to be supported by a cell, or both information.

For example, the base station 100 sets, for a longer self-contained time unit, a larger time resource amount of the uplink control channel in the self-contained time unit.

In the present embodiment, the length of the self-contained time unit is associated with the time resource amount of the uplink control channel in the self-contained time unit, and this association is shared between the base station 100 and the terminal 200.

Then, the base station 100 notifies control information related only to the length of the self-contained time unit (or the length of the self-contained time unit and the number of bits of the response signal) to the terminal 200 through the downlink channel for cell-specific notification (or common to terminals). In other words, information indicating the length of the self-contained time unit is notified as information (time unit information) related to the self-contained time unit, but control information related to the time resource amount of the uplink control channel in the self-contained time unit is not notified.

The terminal 200 receives, from the base station 100, information related to the length of the self-contained time unit (or the length of the self-contained time unit and the number of bits of the response signal) notified through the downlink channel for cell-specific notification (or common to terminals), and specifies the time resource amount of the uplink control channel, which is associated with the received length of the self-contained time unit. Then, the terminal 200 specifies the resource of the self-contained time unit based on the length of the self-contained time unit, the number of bits of the response signal, and the time resource amount of the uplink control channel.

Figure 11A:
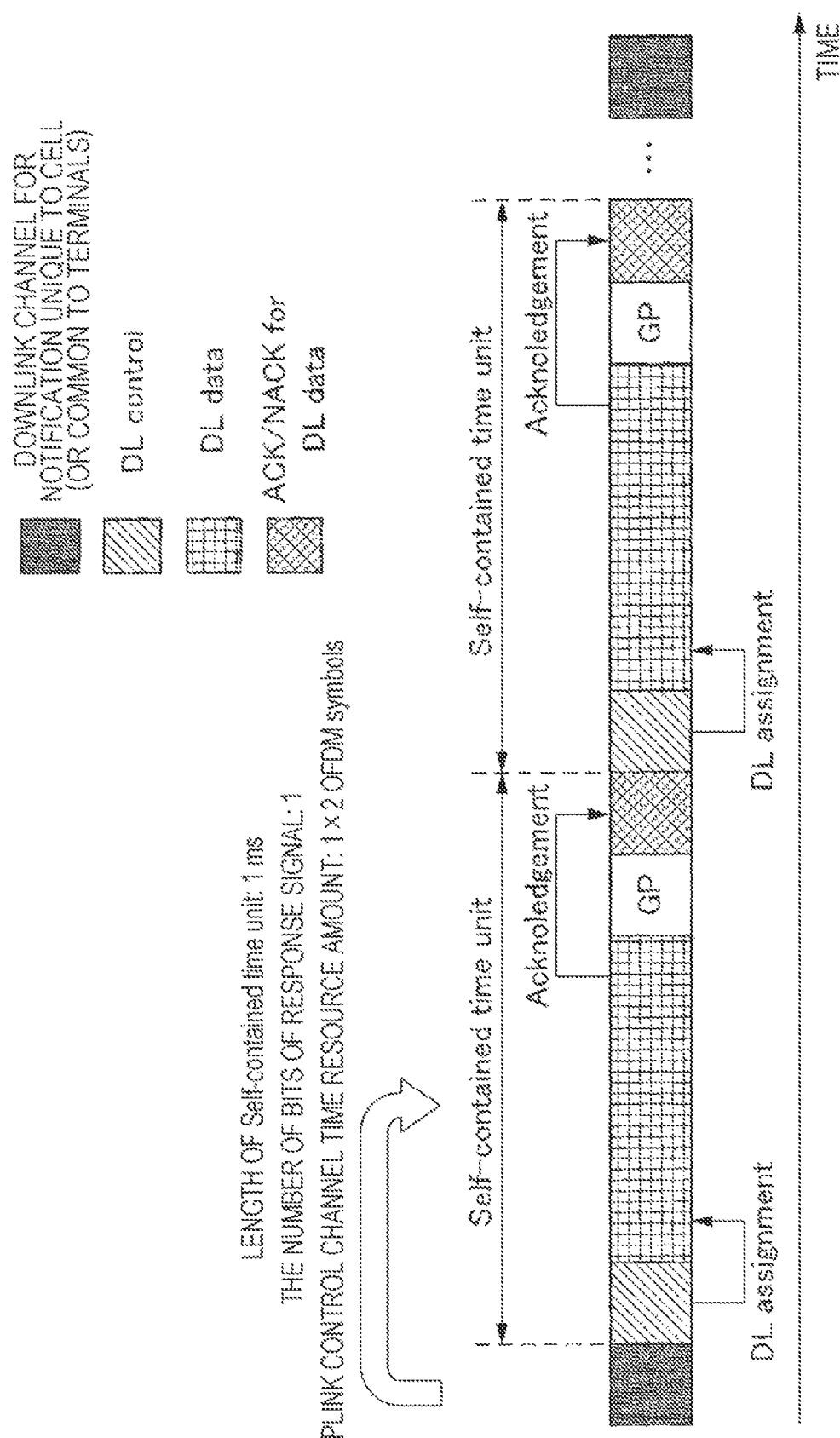
FIG. 11A is a diagram illustrating an exemplary self-contained operation according to Embodiment 2.

FIGS. 11A and 11B each illustrate exemplary self-contained operation according to the present embodiment.

First, the base station 100 notifies, to the terminal 200 through the downlink channel for notification unique to a cell (or common to terminals), the length of the self-contained time unit, and the number of bits of the response signal transmitted through the uplink control channel in the self-contained time unit.

For example, the length of the self-contained time unit is 1 ms in FIG. 11A, and 2 ms in FIG. 11B.

The number of bits of the response signal is 1 bit in FIGS. 11A and 11B.

The time resource amount of the uplink control channel is implicitly notified in association with the length of the self-contained time unit.

For example, the time resource amount of the uplink control channel is 2 OFDM symbols in FIG. 11A (the length of the self-contained time unit: 1 ms), and 4 OFDM symbols in FIG. 11B (the length of the self-contained time unit: 2 ms). Accordingly, in FIGS. 11A and 11B, the time resource amount of the uplink control channel is associated in proportional to the length of the self-contained time unit.

The association between the length of the self-contained time unit and the time resource amount of the uplink control channel may have a proportional relation as illustrated in FIGS. 11A and 11B, or may be association determined in a table or the like in advance.

The length of the self-contained time unit and the time resource amount of the uplink control channel may have granularity in units of OFDM symbols or may have granularity in units of subframes each made of a plurality of OFDM symbols. The granularity of the length of the self-contained time unit may differ from the granularity of the time resource amount of the uplink control channel.

In FIG. 11B, as compared to FIG. 11A, the length of the self-contained time unit is long, and the time resource amount of the uplink control channel is large.

For example, when low latency is requested and a small communication area (coverage) is requested (no large communication area is needed) for the cell of the base station 100, the base station 100 sets, to the terminal 200, a short length of a the length of the self-contained time unit and the time resource of the uplink control channel made of a small number of OFDM symbols as illustrated in FIG. 11A. Accordingly, the terminal 200 can transmit the response signal with low latency while maintaining the needed communication area.

When increase of the communication area is prioritized over low latency for the cell of the base station 100, the base station 100 sets, to the terminal 200, a longer length of the self-contained time unit and an increased time resource amount of the uplink control channel as illustrated in FIG. 11B. Accordingly, as compared to FIG. 10A or 10B, the terminal 200 transmits, with large latency, the response signal through the time resource of the uplink control channel made of a further large number of OFDM symbols (with sufficient transmission electric power), thereby achieving a large communication area.

In this manner, in the present embodiment, the base station 100 determines the length of the self-contained time unit and the time resource amount of the uplink control channel in accordance with a condition requested for a communication area (coverage) in a cell or the number of bits of the response signal.

Then, the base station 100 notifies, to the terminal 200, the set length of the self-contained time unit but not the time resource amount of the uplink control channel. The terminal 200 specifies the time resource amount of the uplink control channel, which is associated with the notified length of the self-contained time unit.

In other words, the base station 100 can control the time resource amount of the uplink control channel in the self-contained time unit by notifying only the length of the self-contained time unit through notification unique to a cell (or common to terminals). Accordingly, the time resource amount of the uplink control channel does not need to be notified, and the overhead of notification unique to a cell (or common to cells) can be reduced accordingly.

In the present embodiment, similarly to Embodiment 1, the base station 100 can appropriately control the time resource amount of the uplink control channel in accordance with a HARQ operation or a condition requested for a communication area to be supported by a cell.

In the present embodiment, the number of bits of the response signal does not need to be explicitly notified to the terminal 200 through notification unique to a cell (or common to users). In this case, the terminal 200 may determine the number of bits of the response signal based on a result of decoding a downlink control signal to which downlink data is assigned or a result of decoding the downlink data.

Embodiment 3

In Embodiments 1 and 2, in a cell for which increase of the communication area is prioritized over low latency, the length of the self-contained time unit and the time resource amount of the uplink control channel are increased to achieve a large communication area (refer to FIGS. 10C and 11B, for example).

However, the cell potentially includes both of a terminal that is positioned near the base station and does not need increase of the time resource amount of the uplink control channel, and a terminal that is positioned far from the base station and needs increase of the time resource amount of the uplink control channel. In other words, the cell potentially includes terminals having different conditions requested for the communication area (coverage). It is desirable to have a shorter self-contained time unit for the terminal that does not need increase of the time resource amount of the uplink control channel.

Thus, the present embodiment describes below a method of efficiently performing HARQ in a self-contained operation for each of terminals having different conditions requested for the communication area.

A base station and a terminal according to the present embodiment have basic configurations same as those of the base station 100 and the terminal 200 according to Embodiment 1, and thus will be described below with reference to FIGS. 7 and 8.

Similarly to Embodiment 1, the present embodiment describes a TDD system in which the timings of downlink communication and uplink communication coincide with each other in a unit band as illustrated in FIG. 9.

In the method according to Embodiment 1 or 2, the base station 100 notifies, to the terminal 200, information related to the length of the self-contained time unit, information related to the number of bits of the response signal transmitted through the uplink control channel in the self-contained time unit, and information related to the time resource of the uplink control channel for transmission of the response signal for downlink data in the self-contained time unit. The terminal 200 specifies the resource of the self-contained time unit in accordance with the notification from the base station 100.

In the present embodiment, the time resource amount of the uplink control channel in each self-contained time unit is fixed. In the present embodiment, to increase the communication area, the terminal 200 repetitively transmits the response signal through uplink control channels of a plurality of self-contained time units.

The base station 100 determines the number of self-contained time units used for the repetitive transmission of the response signal at the terminal 200 (in other words, the number of uplink control channels or the number of times of repetition) based on the number of bits of the response signal, a condition requested for a communication area to be supported by a cell, or both information. Accordingly, the time resource amount of the uplink control channel used for transmission of the response signal is determined.

The number of times of repetition (information indicating the number of self-contained time units, the time resources of uplink control channels of which are to be used) in the repetitive transmission may be dynamically notified through the downlink control channel, or may be periodically notified through user-specific or group-specific notification (for example, different RATs) in a fixed DL subframe disclosed in NPL 4.

FIGS. 12A and 12B each illustrate exemplary self-contained operation according to the present embodiment.

As for a condition requested for the communication area, the terminal 200 satisfying a requested condition in a self-contained operation, which is set by a cell operates HARQ in the self-contained time unit, similarly to Embodiment 1 or 2 (refer to FIG. 12A, for example).

The terminal 200 satisfying a request condition in a self-contained operation, which is set by a cell is, for example, a terminal that is positioned near the base station and does not need increase of the time resource amount of the uplink control channel. In other words, the terminal is capable of transmitting the response signal by using the time resource (2 OFDM symbols) of the uplink control channel in one self-contained time unit as illustrated in FIG. 12A.

The terminal 200 that needs a communication area larger than the communication area of a self-contained operation in a request condition set by a cell feeds the response signal back to the base station 100 through repetitive transmission using the time resources of uplink control channels of a plurality of self-contained time units as illustrated in FIG. 12B.

As illustrated in FIG. 12B, the terminal 200 that needs a large communication area repetitively transmits the response signal through the time resources of uplink control channels of a plurality of self-contained time units, thereby achieving a large communication area. However, as illustrated in FIG. 12A, the terminal 200 that does not need a large communication area transmits the response signal with low latency by using a short self-contained time unit.

Accordingly, according to the present embodiment, the communication area of the terminal 200 that prioritizes increase of the communication area over low latency can be increased through repetitive transmission while the length of the self-contained time unit is maintained short. Thus, in the present embodiment, terminals having different conditions requested for latency or the communication area can be efficiently operated.

Embodiment 4

Embodiments 1 to 3 describe a TDD system in which the timings of downlink communication and uplink communication coincide with each other in a unit band as illustrated in FIG. 9.

However, a flexible duplex system that performs frequency division multiplexing (FDM) of downlink communication and uplink communication in a single band has been discussed as a method of achieving efficient operation of service and terminals having different conditions requested for latency or the communication area in an identical unit band.

Figure 13:
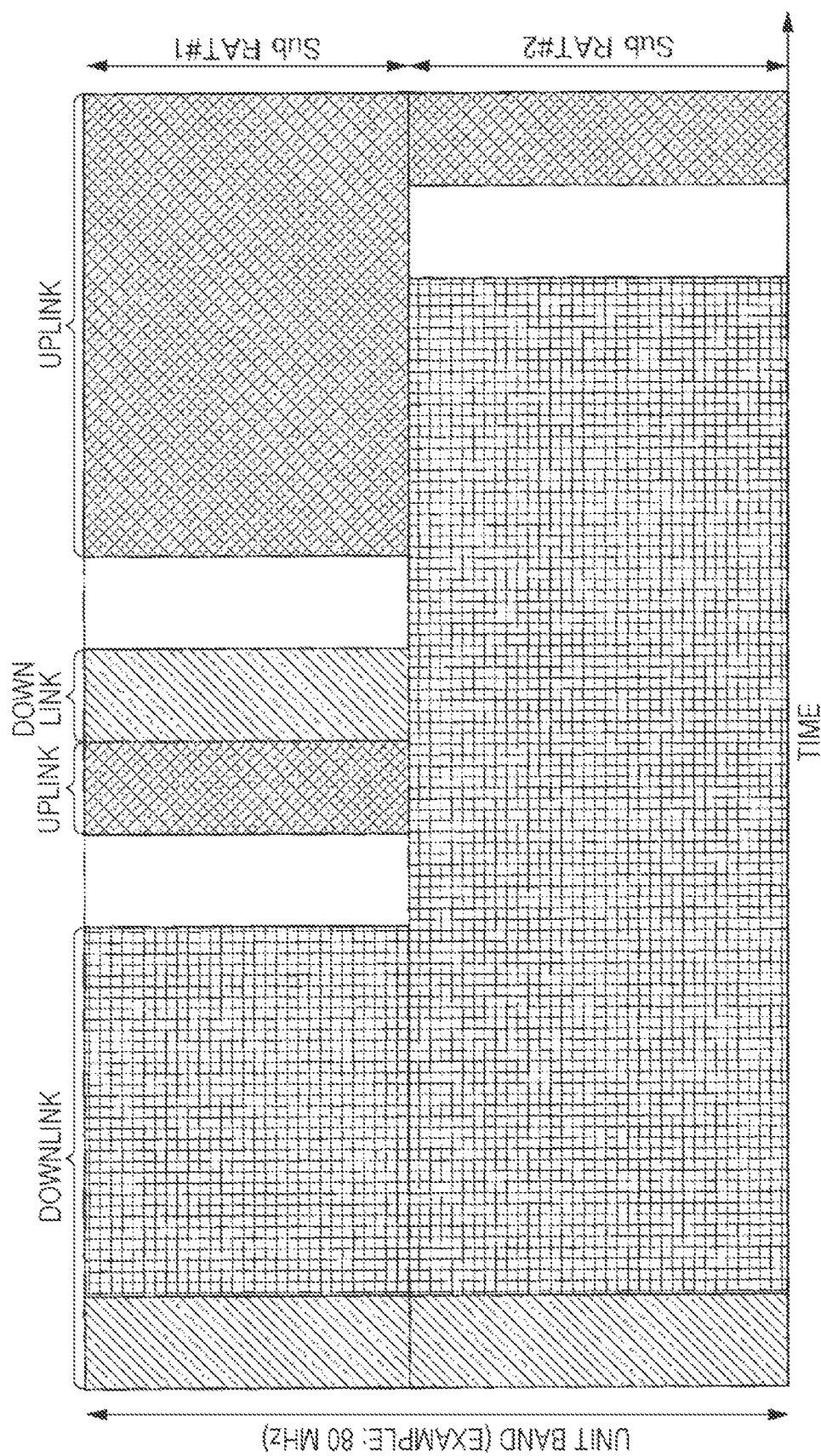
FIG. 13 is a diagram illustrating the timings of downlink communication and uplink communication according to Embodiment 4.

For example, in the flexible duplex system, a unit band includes a plurality of RATs (sub RAT #1 and sub RAT #2) having different request conditions as illustrated in FIG. 13. In the flexible duplex system, the timings of downlink communication and uplink communication are identical in each RAT, and the timings of downlink communication and uplink communication are different between different RATs.

The present embodiment describes below a self-contained operation in the flexible duplex system as illustrated in FIG. 13.

A base station and a terminal according to the present embodiment have basic configurations same as those of the base station 100 and the terminal 200 according to Embodiment 1, and thus will be described below with reference to FIGS. 7 and 8.

The base station 100 notifies, to the terminal 200, information related to the length of the self-contained time unit through a downlink channel for group-specific or RAT-specific notification. For example, group-specific or RAT-specific notification and related to the length of the self-contained time unit is periodically transmitted in a fixed DL subframe disclosed in NPL 4. Accordingly, the notification in each fixed DL subframe determines the length of the self-contained time unit for a radio resource until the next fixed DL subframe.

The base station 100 also notifies, to the terminal 200 through the downlink channel for group-specific or RAT-specific notification, information related to the number of bits of the response signal transmitted through the uplink control channel in the self-contained time unit. For example, group-specific or RAT-specific notification and related to the number of bits of the response signal is periodically transmitted in a fixed DL subframe disclosed in NPL 4. Accordingly, the notification in each fixed DL subframe determines the number of bits of the response signal in the self-contained time unit for a radio resource until the next fixed DL subframe.

The base station 100 also notifies, to the terminal 200 through group-notification or RAT-specific notification, information related to the time resource of the uplink control channel for transmission of the response signal for downlink data in the self-contained time unit. For example, group-specific or RAT-specific notification and related to the time resource of the uplink control channel for transmission of the response signal is periodically transmitted in a fixed DL subframe disclosed in NPL 4. Accordingly, the notification in each fixed DL subframe determines the time resource amount of the uplink control channel for transmission of the response signal in the self-contained time unit for a radio resource until the next fixed DL subframe.

Similarly to Embodiments 1 to 3, the base station 100 determines the time resource amount of the uplink control channel for transmission of the response signal for downlink data in the self-contained time unit based on the number of bits of the response signal, a condition requested for a communication area to be supported by a RAT, or both information.

The length of the self-contained time unit and the time resource amount of the uplink control channel may be individually notified through the downlink channel for group-specific or RAT-specific notification, and the time resource amount of the uplink control channel may be implicitly notified in association with the length of the self-contained time unit as in Embodiment 2.

The terminal 200 receives, from the base station 100, information related to the length of the self-contained time unit, information related to the number of bits of the response signal transmitted through the uplink control channel in the self-contained time unit, and information related to the time resource of the uplink control channel for transmission of the response signal for downlink data in the self-contained time unit, which are notified through the downlink channel for group-specific or RAT-specific notification, and specifies the resource of the self-contained time unit based on received control information.

Then, the terminal 200 receives downlink data (DL data) based on downlink assignment information notified through the downlink channel in the self-contained time unit, assigns the response signal for the downlink data (ACK/NACK for DL data) to the time resource of the uplink control channel for transmission of the response signal, and transmits the response signal to the base station 100.

FIGS. 14A and 14B each illustrate exemplary self-contained operation according to the present embodiment. FIG. 14A illustrates a self-contained operation for RAT #1, and FIG. 14B illustrates a self-contained operation for RAT #2.

First, the base station 100 notifies, to the terminal 200 through the downlink channel for group-specific or RAT-specific notification, the length of the self-contained time unit, the number of bits of the response signal transmitted through the uplink control channel in the self-contained time unit, and the time resource amount of the uplink control channel in the self-contained time unit.

As illustrated in FIG. 14A, the length of the self-contained time unit for RAT #1 is 1 ms, and the time resource amount of the uplink control channel for RAT #1 is 2 OFDM symbols. As illustrated in FIG. 14B, the length of the self-contained time unit for RAT #2 is 2 ms, and the time resource amount of the uplink control channel for RAT #2 is 14 OFDM symbols.

The length of the self-contained time unit and the time resource amount of the uplink control channel may have granularity in units of OFDM symbols, or may have granularity in units of subframes each made of a plurality of OFDM symbols. The granularity of the length of the self-contained time unit may differ from the granularity of the time resource amount of the uplink control channel.

In this manner, in the present embodiment, the base station 100 can control the time resource amount of the uplink control channel, which is appropriate for service (request condition) supported by each RAT, by performing notification unique to a group (or unique to a RAT) for control information related to the self-contained time unit.

For example, when low latency is requested and a small communication area (coverage) is requested (no large communication area is needed) for RAT #1, the base station 100 sets, to a group of RAT #1, a short length of the self-contained time unit and the time resource of the uplink control channel made of a small number of OFDM symbols as illustrated in FIG. 14A. Accordingly, the terminal 200 that belongs to RAT #1 can transmit the response signal with low latency while maintaining the needed communication area.

When increase of the communication area is prioritized over low latency for RAT #2, the base station 100 sets, to a group of RAT #2, a long length of the self-contained time unit and an increased time resource amount of the uplink control channel as illustrated in FIG. 14B. Accordingly, as compared to RAT #1, the terminal 200 that belongs to RAT #2 transmits, with large latency, the response signal through the time resource of the uplink control channel made of a further large number of OFDM symbols (with sufficient transmission electric power), thereby achieving a large communication area.

In this manner, in the present embodiment, the base station 100 can set the resource of the self-contained time unit for each of a plurality of RATs in accordance with a condition (on the communication area, for example) requested at the each RAT in a unit band in the flexible duplex system. Accordingly, in the present embodiment, the base station 100 can improve the efficiency of resource use by appropriately performing uplink resource control for each RAT.

In the present embodiment, the number of bits of the response signal does not need to be explicitly notified to the terminal 200 through group- or RAT-specific notification. In this case, the terminal 200 may determine the number of bits of the response signal based on a result of decoding a downlink control signal to which downlink data is assigned or a result of decoding the downlink data.

In the present embodiment, the length of the self-contained time unit, the number of bits of the response signal transmitted through the uplink control channel in the self-contained time unit, and the time resource amount of the uplink control channel in the self-contained time unit may be partially cell-specific notification (or common to groups, common to RATs).

Embodiment 5

The present embodiment describes below a self-contained operation in a flexible duplex system in which a unit band includes one or a plurality of RATs and the timings of uplink communication and downlink communication are different between terminals (UEs) in each RAT as illustrated in FIG. 15.

A base station and a terminal according to the present embodiment have basic configurations same as those of the base station 100 and the terminal 200 according to Embodiment 1, and thus will be described below with reference to FIGS. 7 and 8.

The base station 100 notifies information related to the length of the self-contained time unit to the terminal 200 through a downlink channel for UE-specific notification. For example, UE-specific notification and related to the length of the self-contained time unit is periodically transmitted in a fixed DL subframe disclosed in NPL 4. Accordingly, the notification in each fixed DL subframe determines the length of the self-contained time unit for a radio resource until the next fixed DL subframe.

The base station 100 also notifies, to the terminal 200 through the downlink channel for UE-specific notification, information related to the number of bits of the response signal transmitted through the uplink control channel in the self-contained time unit. For example, UE-specific notification and related to the number of bits of the response signal is periodically transmitted in a fixed DL subframe disclosed in NPL 4. Accordingly, the notification in each fixed DL subframe determines the number of bits of the response signal in the self-contained time unit for a radio resource until the next fixed DL subframe.

The base station 100 also notifies, to the terminal 200 through notification, information related to the time resource of the uplink control channel for transmission of the response signal for downlink data in the self-contained time unit. For example, UE-specific notification and related to the time resource of the uplink control channel for transmission of the response signal is periodically transmitted in a fixed DL subframe disclosed in NPL 4. Accordingly, the notification in each fixed DL subframe determines the time resource amount of the uplink control channel for transmission of the response signal in the self-contained time unit for a radio resource until the next fixed DL sub frame.

Similarly to Embodiments 1 to 3, the base station 100 determines the time resource amount of the uplink control channel for transmission of the response signal for downlink data in the self-contained time unit based on the number of bits of the response signal, a request condition for a communication area to be supported by the terminal 200, or both information.

The length of the self-contained time unit and the time resource amount of the uplink control channel may be individually notified through the downlink channel for UE-specific notification, and the time resource amount of the uplink control channel may be implicitly notified in association with the length of the self-contained time unit as in Embodiment 2.

The length of the self-contained time unit and the time resource amount of the uplink control channel may have granularity in units of OFDM symbols, or may have granularity in units of subframes each made of a plurality of OFDM symbols. The granularity of the length of the self-contained time unit may differ from the granularity of the time resource amount of the uplink control channel.

The terminal 200 receives, from the base station 100, information related to the length of the self-contained time unit, information related to the number of bits of the response signal transmitted through the uplink control channel in the self-contained time unit, and information related to the time resource of the uplink control channel for transmission of the response signal for downlink data in the self-contained time unit, which are notified through the downlink channel for UE-specific notification, and specifies the resource of the self-contained time unit based on received control information.

Then, the terminal 200 receives downlink data (DL data) based on downlink assignment information notified through a downlink channel in the self-contained time unit, assigns the response signal for the downlink data (ACK/NACK for DL data) to the time resource of the uplink control channel for transmission of the response signal, and transmits the response signal to the base station 100.

In this manner, in the present embodiment, the base station 100 can control the time resource amount of the uplink control channel, which is appropriate for service (request condition) supported by each terminal, by performing UE-specific notification for control information related to the self-contained time unit. In other words, in the present embodiment, the base station 100 can set the resource of the self-contained time unit for each of a plurality of terminals 200 in accordance with a condition (on the communication area, for example) requested at the terminal 200 in the flexible duplex system. Accordingly, in the present embodiment, the base station 100 can improve the efficiency of resource use by appropriately performing uplink resource control for each terminal 200.

In the present embodiment, the number of bits of the response signal does not need to be explicitly notified to the terminal 200 through UE-specific notification. In this case, the terminal 200 may determine the number of bits of the response signal based on a result of decoding a downlink control signal to which downlink data is assigned or a result of decoding the downlink data.

In the present embodiment, the length of the self-contained time unit, the number of bits of the response signal transmitted through the uplink control channel in the self-contained time unit, and the time resource amount of the uplink control channel in the self-contained time unit may be partially cell-specific notification (or common to groups, common to RATs) or group-specific/RAT-specific notification.

The embodiments of the present disclosure are described above.

Although each embodiment describes above an example in which an aspect of the present disclosure is configured by hardware, the present disclosure may be achieved by software in cooperation with hardware.

Each functional block used in the above description of the embodiments is typically achieved by an LSI as an integrated circuit. The integrated circuit may control each functional block used in the above description of the embodiments, and include an input and an output. The integrated circuits may be each individually provided as one chip, or may be partially or entirely provided as one chip. LSI is also called an IC, a system LSI, a super LSI, or an ultra LSI, depending on the density of integration.

Each integration circuit is not limited to an LSI, but may be achieved by a dedicated circuit or a general-purpose processor. Alternatively, the integration circuit may be achieved by a field programmable gate array (FPGA), which is programmable after manufacturing of an LSI, or a reconfigurable processor, which is connection and setting of circuit cells inside an LSI are reconfigurable.

Moreover, when an integration technology becomes available in place of LSI through the progress of the semiconductor technology or derivation of another technology, the functional block integration may be achieved by using this technology. For example, biotechnologies may be applied.

A base station of the present disclosure includes: a control unit configured to determine, when a terminal performs communication in a time unit including a downlink time resource for a downlink control signal, a downlink time resource assigned for downlink data by the downlink control signal, and an uplink time resource for a response signal for the downlink data, the amount of the uplink time resource used by the terminal for transmission of the response signal in accordance with a requested communication area or the number of bits necessary for transmission of the response signal; and a transmission unit configured to transmit time unit information including the determined amount of the uplink time resource to the terminal.

In the base station of the present disclosure, the control unit sets a larger amount of the uplink time resource as the requested communication area is larger.

In the base station of the present disclosure, the control unit sets a larger amount of the uplink time resource as the number of bits necessary for transmission of the response signal is larger.

In the base station of the present disclosure, the control unit determines the amount of the uplink time resource independently from the length of the time unit.

In the base station of the present disclosure, the control unit sets a larger amount of the uplink time resource as the time unit is longer.

In the base station of the present disclosure, the transmission unit transmits, as the time unit information, information indicating the length of the time unit.

In the base station of the present disclosure, the amount of the uplink time resource in each time unit is a fixed value, and the control unit determines the number of the time units used for repetitive transmission of the response signal in accordance with the requested communication area or the number of bits necessary for transmission of the response signal.

In the base station of the present disclosure, the transmission unit transmits the time unit information through a downlink channel for cell-specific notification.

In the base station of the present disclosure, the transmission unit transmits the time unit information through a downlink channel for radio access technology (RAT)-specific indication.

In the base station of the present disclosure, the transmission unit transmits the time unit information through a downlink channel for UE-specific notification.

A terminal of the present disclosure is configured to perform communication in a time unit including a downlink time resource for a downlink control signal, a downlink time resource assigned for downlink data by the downlink control signal, and an uplink time resource for a response signal for the downlink data. The terminal of the present disclosure includes a reception unit configured to receive, from a base station, time unit information related to the amount of the uplink time resource used for transmission of the response signal, and a signal assignment unit configured to assign the response signal for the uplink time resource indicated by the time unit information. Here, the amount of the uplink time resource is determined in accordance with the requested communication area or the number of bits necessary for transmission of the response signal.

A communication method of the present disclosure includes: determining, when a terminal performs communication in a time unit including a downlink time resource for a downlink control signal, a downlink time resource assigned for downlink data by the downlink control signal, and an uplink time resource for a response signal for the downlink data, the amount of the uplink time resource used by the terminal for transmission of the response signal in accordance with the requested communication area or the number of bits necessary for transmission of the response signal; and transmitting time unit information related to the determined amount of the uplink time resource to the terminal.

A communication method of the present disclosure is performed by a terminal configured to perform communication in a time unit including a downlink time resource for a downlink control signal, a downlink time resource assigned for downlink data by the downlink control signal, and an uplink time resource for a response signal for the downlink data. The communication method of the present disclosure includes: receiving, from a base station, time unit information related to the amount of the uplink time resource used for transmission of the response signal; and assigning the response signal for the uplink time resource indicated by the time unit information. Here, the amount of the uplink time resource is determined in accordance with the requested communication area or the number of bits necessary for transmission of the response signal.

An aspect of the present disclosure is useful for a mobile communication system.

REFERENCE SIGNS LIST 100 base station
101, 207 control unit
102 control signal generation unit
103 control signal encoding unit
104 control signal modulation unit
105 data encoding unit
106 retransmission control unit
107 data modulation unit
108, 210 signal assignment unit
109, 211 transmission waveform generation unit
110, 212 transmission unit
111, 201 antenna
112, 202 reception unit
113, 203 extraction unit
114 demodulation and decoding unit
115 determination unit
200 terminal
204 data demodulation unit
205 data decoding unit
206 error detection unit
208 ACK/NACK generation unit
209 encoding and modulation unit

The invention claimed is:

1. An integrated circuit, comprising:
transmission circuitry, which, in operation, controls transmitting control information relating to a number of symbols for an uplink time resource in a time unit, the time unit including a downlink time resource for a downlink transmission and the uplink time resource for a transmission of a response signal,
wherein in a case where the response signal is repeated, a same number of symbols is indicated by the control information for each of a plurality of time units; and
reception circuitry, which, in operation, controls receiving the response signal over the plurality of time units,
wherein a number of repetitions of the response signal is determined based on a number of bits in the response signal.

2. The integrated circuit according to claim 1, wherein the reception circuitry, in operation, controls receiving the response signal repeatedly over the plurality of time units at a constant time interval.

3. The integrated circuit according to claim 1, wherein the transmission circuitry, in operation, controls transmitting another control information relating to a length of the time unit via a cell-specific notification.

4. The integrated circuit according to claim 1, wherein the number of symbols for the uplink time resource is larger as a length of the time unit is larger.

5. A base station, comprising:
a transmitter, which, in operation, transmits control information relating to a number of symbols for an uplink time resource in a time unit, the time unit including a downlink time resource for a downlink transmission and the uplink time resource for a transmission of a response signal,
wherein in a case where the response signal is repeated, a same number of symbols is indicated by the control information for each of a plurality of time units; and
a receiver, which, in operation, receives the response signal over the plurality of time units,
wherein a number of repetitions of the response signal is determined based on a number of bits in the response signal.

6. The base station according to claim 5, wherein the receiver, in operation, receives the response signal repeatedly over the plurality of time units at a constant time interval.

7. The base station according to claim 5, wherein the transceiver, in operation, transmits another control information relating to a length of the time unit via a cell-specific notification.

8. The base station according to claim 5, wherein the number of symbols for the uplink time resource is larger as a length of the time unit is larger.

9. A communication method, comprising:
transmitting control information relating to a number of symbols for an uplink time resource in a time unit, the time unit including a downlink time resource for a downlink transmission and the uplink time resource for a transmission of a response signal,
wherein in a case where the response signal is repeated, a same number of symbols is indicated by the control information for each of a plurality of time units; and
receiving the response signal over the plurality of time units,
wherein a number of repetitions of the response signal is determined based on a number of bits in the response signal.

10. The communication method according to claim 9, further comprising:
receiving the response signal repeatedly over the plurality of time units at a constant time interval.

11. The communication method according to claim 9, further comprising:
transmitting another control information relating to a length of the time unit via a cell-specific notification.

12. The communication method according to claim 9, wherein the number of symbols for the uplink time resource is larger as a length of the time unit is larger.

* * * * *